United States Patent
Jiménez Giménez et al.

(10) Patent No.: US 12,556,099 B2
(45) Date of Patent: Feb. 17, 2026

(54) MULTI-CELL SWITCHING POWER CONVERTER AND CONTROL METHOD

(71) Applicants: Gamesa Electric, S.A. Unipersonal, Zamudio (ES); Universidad Carlos III de Madrid, Getafe (ES)

(72) Inventors: Jorge Jiménez Giménez, Madrid (ES); Antonio Lazaro Blanco, Leganes (ES); Gonzalo Moreno Huerta, Aranjuez (ES); Pablo Moreno-Torres Concha, Leganes (ES)

(73) Assignees: GAMESA ELECTRIC, S.A. UNIPERSONAL, Zamudio (ES); UNIVERSIDAD CARLOS III DE MADRID, Getafe (ES)

( * ) Notice: Subject to any disclaimer, the term of this patent is extended or adjusted under 35 U.S.C. 154(b) by 190 days.

(21) Appl. No.: 18/565,141

(22) PCT Filed: Jun. 10, 2022

(86) PCT No.: PCT/EP2022/065789
§ 371 (c)(1),
(2) Date: Nov. 29, 2023

(87) PCT Pub. No.: WO2022/258795
PCT Pub. Date: Dec. 15, 2022

(65) Prior Publication Data
US 2024/0275288 A1    Aug. 15, 2024

(30) Foreign Application Priority Data

Jun. 11, 2021 (EP) .................................. 21382521

(51) Int. Cl.
*H02M 3/158* (2006.01)
(52) U.S. Cl.
CPC ................................ *H02M 3/1586* (2021.05)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 6,788,033 B2 * 9/2004 Vinciarelli .......... H02M 3/1582
323/225
8,233,294 B2 * 7/2012 Chen ................. H02M 7/53873
363/40

(Continued)

OTHER PUBLICATIONS

International Search Report and Written Opinion for PCT/EP2022/065789, mailed on Aug. 1, 2022.
(Continued)

*Primary Examiner* — Jeffrey A Gblende
(74) *Attorney, Agent, or Firm* — Schmeiser, Olsen & Watts, LLP

(57) ABSTRACT

A method of controlling a multi-cell switching power converter is provided. The power converter includes converter legs connected in parallel, each converter leg including at least one converter cell that is operated in accordance with a switching sequence that includes transitions between predetermined switching states and that generates a current waveform in the converter leg. The method includes operating the power converter in an interleaving mode in which each converter leg is operated with a switching sequence having a different phase, generating a periodic reference signal, and controlling the phase shift between the switching sequences of the converter legs by detecting, for each converter leg, an intersection between the current waveform generated by the converter leg and the periodic reference signal. Upon detecting the intersection of the current waveform of a converter leg with the reference signal, a transition to a predetermined switching state of the switching sequence is triggered.

15 Claims, 11 Drawing Sheets

(58) Field of Classification Search
CPC ............... H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02J 3/46; H02J 3/38
See application file for complete search history.

(56) References Cited

U.S. PATENT DOCUMENTS

| 11,334,108 | B2* | 5/2022 | Mannes Hillesheim ................... H03K 5/01 |
|---|---|---|---|
| 11,863,171 | B2* | 1/2024 | Hayashi .................. H02M 1/08 |
| 2004/0239299 | A1 | 12/2004 | Vinciarelli |
| 2018/0294726 | A1 | 10/2018 | Priego et al. |
| 2021/0175879 | A1 | 6/2021 | Archibald et al. |

OTHER PUBLICATIONS

Angel Cid-Pastor et al: "Interleaved Converters Based on Sliding-Mode Control in a Ring Configuration", IEEE Transactions on Circuits and Systems I: Regular Papers, IEEE, US, vol. 58, No. 10, Oct. 1, 2011 (Oct. 1, 2011) pp. 2566-2577, XP011384817, ISSN: 1549-8328, DOI: 10.1109/TCSI.2011.2131310 p. 2566-p. 2573; fiqures 5,9,11.

Wu Haimeng et al: "Nonlinear analysis for interleaved boost converters based on Monodromy matrix", 2014 IEEE Energy Conversion Congress and Exposition (ECCE), IEEE, Sep. 14, 2014 (Sep. 14, 2014), pp. 2511-2516, XP032680754, DOI: 10.1109/ECCE.2014.6953735 p. 2514; figure 2.
Y. Roh at al., "A Two-Phase Interleaved Power Factor Correction Boost Converter With a Variation-Tolerant Phase Shifting Technique," Y. Roh at al., IEEE Transactions on Power Electronics, vol. 29, No. 2, pp. 1032-1040, Feb. 2014.
Liu et al., "Digital-Based Interleaving Control for GaN-Based MHz CRM Totem-Pole PFC," in IEEE Journal of Emerging and Selected Topics in Power Electronics, vol. 4, No. 3, pp. 808-814, Sep. 2016.
Huber et al., "Open-Loop Control Methods for Interleaved DCM/CCM Boundary Boost PFC Converters," in IEEE Transactions on Power Electronics, vol. 23, No. 4, pp. 1649-1657, Jul. 2008.
Huber etal., "Closed-Loop Control Methods for Interleaved DCM/CCM Boundary Boost PFC Converters," 2009 Twenty-Fourth Annual IEEE Applied Power Electronics Conference and Exposition, Washington, DC, 2009, pp. 991-997.
Marxgut et al., "Ultraflat Interleaved Triangular Current Mode (TCM) Single-Phase PFC Rectifier," in IEEE Transactions on Power Electronics, vol. 29, No. 2, pp. 873-882, Feb. 2014.
Chen et al., "A Stepping On-Time Adjustment Method for Interleaved Multichannel PFC Converters," in IEEE Transactions on Power Electronics, vol. 30, No. 3, pp. 1170-1176, Mar. 2015.
Huang et al., "Microcontroller-based MHz totem-pole PFC with critical mode control," 2016 IEEE Energy Conversion Congress and Exposition (ECCE), Milwaukee, WI, 2016, pp. 1-8.
Bing Lu, "A novel control method for interleaved transition mode PFC," 2008 Twenty-Third Annual IEEE Applied Power Electronics Conference and Exposition, Austin, TX, 2008, pp. 697-701.
Ryan et al., (2018). Digital Closed-Loop Control Strategy To Maintain The Phase Shift For a Multi-Channel BCM Boost Converter for PFC Applications. IEEE Transactions on Power Electronics. pp. 1-12.
Lai et al., "Novel on-line parameter tuning method for digital-controlled boost PFC with transition current mode," 2013 IEEE 10th International Conference on Power Electronics and Drive Systems (PEDS), Kitakyushu, 2013, pp. 232-237.

* cited by examiner

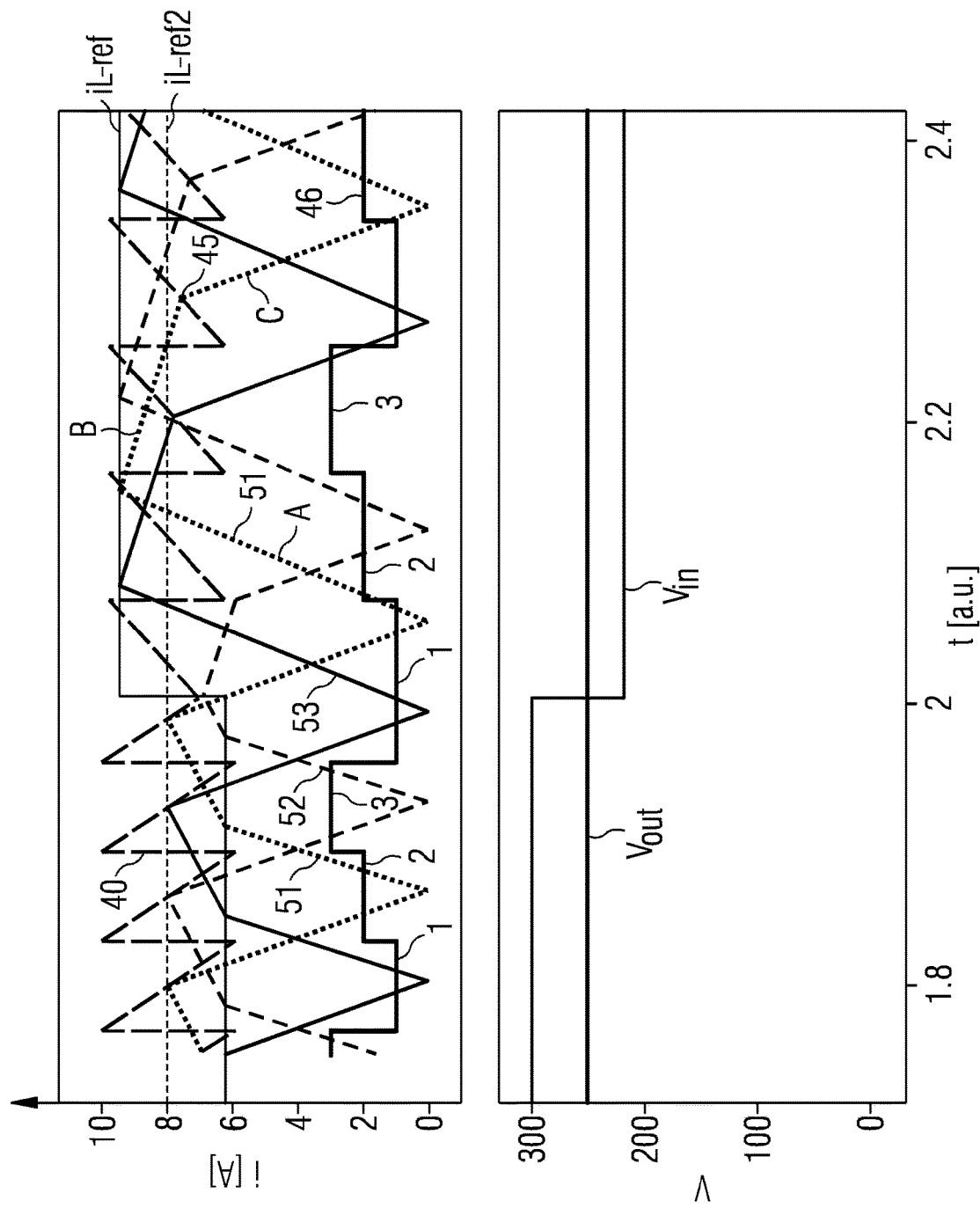

MULTI-CELL SWITCHING POWER CONVERTER AND CONTROL METHOD

CROSS-REFERENCE TO RELATED APPLICATIONS

This application claims priority to PCT Application No. PCT/EP2022/065789, having a filing date of Jun. 10, 2022, which claims priority to EP Application No. 21382521.9, having a filing date of Jun. 11, 2021, the entire contents both of which are hereby incorporated by reference.

FIELD OF TECHNOLOGY

The following relates to a method of controlling the operation of a multi-cell switching power converter, for example of a bidirectional DC-DC power converter, in which a periodic sequence of switching states is applied. It further relates to such multi-cell switching power converter, to a respective controller and to a computer program for controlling the operation of such multi-cell switching power converter.

BACKGROUND

Bidirectional DC-DC power converters find many fields of application, such as for energy storage applications. It may for example be desirable to connect a DC-bus of a grid tied inverter, such as of a wind turbine, to an energy storage device, in particular a battery pack. For most battery chemistries, a respective voltage range is required for charging and discharging the battery. The battery must thus be coupled via a bidirectional DC-DC power converter to the DC bus to provide the required voltages for charging and discharging and to provide bidirectional power flow. The converter must then be capable of stepping down (buck mode), stepping up (boost mode), or stepping up or down (buck-boost mode) the voltage via maintaining the bidirectional power flow capability.

Such bidirectional DC/DC converter can operate with a variable switching frequency. An example is a converter operating in a boundary conduction mode (BCM), in which for different operating points of the converter, the converter needs to operate for a longer or shorter period of time in an ON-state and an OFF-state, thus resulting in a change of the switching frequency. To increase the output power and/or to improve the quality of the output power of such DC/DC converter, it is known to use converters having a multi-cell topology in which the converter comprises plural converter legs connected in parallel, each converter leg including at least one converter cell. To achieve the desired quality of the output power, the converter cells of the different converter legs need to be operated at a respective phase shift (i.e., the switching is delayed between the different converter legs). Such type of operation is termed "interleaving". Such multi-cell operation is however difficult to achieve if the switching frequency of the converter cells is variable.

The document "A Two-Phase Interleaved Power Factor Correction Boost Converter With a Variation-Tolerant Phase Shifting Technique," Y. Roh at al., IEEE Transactions on Power Electronics, vol. 29, no. 2, pp. 1032-1040, February 2014, describes a power factor correction whose converter includes two phases operated in an interleaved critical conduction mode (CRM). A feedback loop similar to a phase loop is employed to control the amount of phase-shifting between the two converter legs. The solution employs a master slave scheme in which one converter leg operates as a master converter and the switching of the other converter leg, which operates as a slave converter, is synchronized to the master. By specifying one converter leg as a master, the synchronization method suffers from reduced flexibility and is furthermore error-prone, since any failure in the converter leg designated as master will result in a malfunction of the converter.

The document "Nonlinear Analysis for Interleaved Boost Converters Based on Monodromy Matrix", Wu et al., 2014 IEEE Energy Conversion congress and Exposition (ECCE), IEEE, 14. September 2014, pages 2511-2516, describes an interleaved boost converter that is controlled using a peak current control strategy. The timing of the converter switching sequences is set by using a clock signal, and the duty cycle of the switching sequence is determined by the peak current control using additional slope compensation.

The document US 2021/175879 A1 describes slope compensation for a current mode control modulator that operates according to a similar scheme as the converter described in the former document. A clock sequencer is used to generate a clock signal for each converter phase.

The document US 2018/294726 A1 describes a multi-phase power regulator that generates a triggering signal by pulling down a reference signal using a current setpoint adjustment circuit. The time constant of the trigger signal is determined by the electric components of the current setpoint adjustment circuit.

It is therefore desirable to provide an efficient solution for operating a multi-phase power converter that allows a relatively simple and straightforward implementation and that does not suffer from the draw backs associated with a master slave operation. It is further desirable that such solution is not linked to a particular type of modulation of the switching of such power converter and that quickly adapts to the correct interleaving operation upon changes in the switching frequency.

SUMMARY

An aspect relates to improving the interleaved operation of a power converter.

In a first aspect, a method of controlling the operation of a multi-cell switching power converter is provided. The power converter comprises at least two converter legs connected in parallel, each converter leg including at least one converter cell that is operated in accordance with a switching sequence that includes transitions between predetermined switching states and that generates a current waveform in the converter leg. In embodiments, the method comprises operating the power converter in an interleaving mode in which the switching sequence of each of the converter legs is phase-shifted with respective to the switching sequences of the one or more other converter legs so that each converter leg is operated with a switching sequence having a different phase and generates a current waveform having a corresponding phase. For example, the inductor current and the current output of each converter leg may be phase-shifted with respect to each of the other converter legs. In embodiments, the method further includes generating a periodic reference signal, wherein the periodicity of the reference signal is determined based on the number of different phases (i.e., the number of converter legs). In embodiments, the method further includes controlling the phase shift between the switching sequences of the two or more converter legs by detecting, for each converter leg, an intersection between the current waveform generated by the converter leg and the periodic reference signal, and upon detecting the intersection of the current waveform of a converter leg with the reference signal, triggering for this converter leg a transition to a predetermined switching state of the switching sequence.

By employing a common reference signal for the different converter legs, the desired phase shift between the different converter legs may be established reliably in a simple manner. By basing the control of the phase shift on a respective intersection between the current waveform and the reference signal, it becomes possible to establish the trigger point and thus the phase shift without designating one of the converter legs as a master and the other as slaves, but the phase shift is rather naturally established based on the respective intersection. Consequently, if one of the converter legs fails, the other converter legs can continue to operate and can be synchronized by a respectively adjusted reference signal, in particular as the periodicity of the reference signal depends on the number of phases and thus of converter legs. The time delay (phase shift) of the switching sequences for the different converter legs can thus be established in a simple and robust way.

The current waveform may in particular be a waveform of an inductor current through an inductor comprised in the converter cell of each converter leg. In embodiments, the method may include obtaining a measurement of the inductor current for each of the converter legs, or measuring the inductor current for each of the converter legs. As the current waveform is generated by switching switches of the converter cell in accordance with the switching sequence, it should be clear that the phase and period of the current waveform corresponds to that of the switching sequence. A phase shift between the switching sequences may in particular correspond to a delay between these switching sequences. Generally, the phase shift between the different converter legs should be equal, i.e., 360° divided by the number of phases (for two, three or four phases, the desired phase shift would be 180°, 120° and 90°, respectively).

The reference signal is the same signal for each of the converter legs. It is however also conceivable that the reference signal is separated into a respective number of dependent signals, one for each converter leg, which may only comprise the signal components relevant for the respective converter leg. However, such signal would still correspond to the reference signal, as only components thereof are considered individually, whereas the overall signal is still the same. Periodicity may refer to that the reference signal includes a sequence of corresponding (similarly shaped) reference waveforms (e.g., ramps), and the number of phases may determine the number of reference waveforms within a time period corresponding to a (target) period T of the switching sequence (the period of a reference waveform may be T/number of phases). Subsequent reference waveforms in the reference signal can differ in their parameters (e.g., upper limit, lower limit and/or slope of ramp), or they may be identical. They may further change during operation, e.g., when changing the input/output voltages or operating mode. It should further be clear that the predetermined switching state, to which the transition is triggered upon detecting an intersection, is a corresponding switching state for each of the converter legs, i.e., the same transition may be triggered for each of the converter legs. By controlling the phase shift between the triggering using the reference signal, the phase shift of the generated current waveform can be controlled efficiently.

It should be clear that it is not excluded that the power converter may also comprise converter cells that are operated in phase, for example by providing two parallel converter cells within the same converter leg that are in phase in order to increase the output power of the power converter. Such parallel converter cells may accordingly be triggered by the same trigger so that they stay in phase.

In an embodiment, the period of the reference signal corresponds to the period T of the switching sequence (i.e., of the current waveform) divided by the number of converter legs (i.e., the number of different phases). The different current waveforms that correspond to the different converter legs may be intersected with the same reference signal. By such reference signal, a correct timing and in particular the correct phase shift for the different converter phases may be obtained.

In an embodiment, the period of the switching sequence (i.e., the time length of the switching sequence) is variable, it may in particular vary during operation (e.g., when changing the operating point of the power converter). In embodiments, the method may include adapting the period of the reference signal in accordance with a change of the period of the switching sequence. Such adaptation may be based on an operating point of the power converter. For example, it may be based on the desired operating point, e.g., on a desired trigger value for triggering the transition to a subsequent switching state (e.g., a current reference, iref, which is determined by the operating point). A target period of the switching sequence may be derived from the trigger value and the period of the reference signal may be determined based on the target period of the switching sequence and the number of converter legs. The period of the reference signal may thus be adapted upon a change of the trigger value. By such change of the reference signal, the actual switching sequence will then converge towards the target period. By such method, the reference signal may be generated such that the intersection between the current waveform of the respective converter leg and the reference signal lies at the trigger value (e.g., iref) when steady state operation is reached.

The periodic reference signal may in particular be a saw tooth-shaped signal comprising repeating ramps. Within one period of the switching sequence, the reference signal may in particular comprise one ramp for each converter leg, i.e., for each phase. By detecting an intersection with a respective ramp, the fast convergence of the phase shift between the different converter legs to the desired timing may be achieved.

In an embodiment, the ramp for each converter leg has the same slope. The slope may certainly change, for example when the operating point of the power converter changes, e.g., the input/output voltage changes, but the slope of the ramp for each converter leg may be changed in the same way so that the ramps for the different converter legs still have the same slope.

In embodiments, the method may further comprise obtaining a reference current (iref) for the transition to the switching state, and determining a period of the switching sequence (target period) based on the reference current and the current waveform. For example, based on the input and output voltages and the inductance of the inductor of the converter cell, the slope of the currents of the current waveform may be determined, wherein the transition between sections of the current waveform occurs at the reference current. Accordingly, the period T of the current waveform and thus of the switching sequence can be derived. For a three-stage modulation scheme (e.g., the TCM-scheme described below), a further reference current may be obtained and a duration of an intermediate section of the current waveform between these two current references may be derived, e.g., by deriving the slope of such section based on the inductance value and the input and output voltages. The switching state to which the transition occurs may correspond to a falling current of the current waveform. The switching state that corresponds to the part of the current waveform that is intersected with the reference signal may correspond to a rising current in the current waveform (e.g., for BCM, or for TCM in buck mode), or may correspond to a falling current (e.g., for TCM in boost mode).

In embodiments, the method may further include deriving the period of the periodic reference signal from the period T of the switching sequence, e.g., by division by the number of converter legs.

In an example, the reference signal is generated based on an upper limit and a lower limit, wherein generating the reference signal comprises generating a ramp from the upper limit to the lower limit and re-setting the ramp upon reaching the lower limit (leading edge), or generating a ramp from the lower limit to the upper limit and re-setting the ramp upon reaching the upper limit (trailing edge ramp). As the reference signal may correspond to a current, such limits may correspond to current limits: it should however be clear that the current waveform may be measured by a current sensor that gives out a voltage signal, so that the reference signal may likewise correspond to a voltage signal and the limit may correspond to respective voltage limits. In an embodiment, the limits are selected such that the reference current for the transition to the switching state lies between the limits. The ramp may have a respective slope. The upper limit, the slope and the lower limit may be selected such that the period of the ramp corresponds to the desired period of the reference signal, in particular to the period of the switching sequence divided by the number of converter legs.

For example, generating the periodic reference signal may comprise setting a slope of the ramp to a predetermined value and deriving the upper limit and the lower limit based on the current reference and the period of the switching sequence, or generating the periodic reference signal may comprise setting the upper limit and the lower limit such that the current reference lies between the upper limit and the lower limit and deriving a slope of the ramp based on the period of the switching sequence. In other words, the upper/lower limits and the slopes are selected such that the period of the ramp corresponds to the switching period divided by the number of converter legs. The ramp may extend to equal parts above and below the reference current value (e.g., by setting the upper and lower limits symmetrically about the current reference value). This is however not necessary and other implementations of the reference signal are conceivable.

In an embodiment, by the switching sequence, the current waveform is controlled to have at least a first section of rising current and a further section of falling current, which may be the last section of the current waveform. The current waveform may consist of these two sections or may include a further intermediate section. The slope of the ramp mentioned above may be selected to correspond to the slope of the first rising current. The switching state to which the transition is triggered upon detection of the intersection may correspond to the further section of falling current.

The waveform may start at about zero current and may end at about zero current. In other words, the transition from the last switching state of the switching sequence to the first switching state of the next switching sequence may occur at a zero crossing of the current, in particular of the inductor current. The inductor current may be a falling current for the last switching state and a rising current for the first switching state. A zero current detector may be employed to trigger the respective transition.

For example, the switching sequence may correspond to an operation of the power converter in a modulation mode, wherein the modulation mode is a boundary conduction mode (BCM). In another example, the modulation mode may be a three-stage conduction mode (TCM), in which the current waveform includes a first section of rising current, a second (intermediate) section of rising, falling or constant current and a third section of falling current. The second section may in particular not include a zero crossing. In the BCM modulation mode, the current waveform may comprise a first section of rising current and a second section of falling current. The respective current waveform may consist of the respective sections. In both cases, the transition from a waveform to the subsequent waveform may occur at a zero crossing. The current reference based on which the reference signal may be determined may correspond to a current reference for the transition to the last section of falling current of the current waveform: other implementations are certainly conceivable.

For the TCM-modulation mode, the transition that is triggered may correspond to the transition from the second section to the third section of the current waveform. The power converter may be operable in a buck mode in which the second section of the current waveform corresponds to a rising current and in which the reference signal is generated as sequence of repeating leading-edge ramps. The power converter may also be operable in a boost mode in which the second section of the current waveform corresponds to a falling current and in which the reference signal is generated as a sequence of repeating trailing edge ramps. For a leading-edge ramp, the reference value is ramped-down from an upper limit to a lower limit, whereas for a trailing edge ramp, the reference value is ramped-up from the lower limit to the upper limit. Accordingly, the reference signal may be generated in a way that even allows the switching between buck operation and boost operation of the power converter while the desired phase shift between the converter legs can be maintained.

The periodic reference signal may comprise a sequence of a repeating reference waveform (in particular a ramp), wherein within the duration of one period of the switching sequence T, the reference signal may comprise one reference waveform per converter leg, the reference waveform being associated with the respective converter leg. Detecting an intersection between the current waveform of each converter leg and the periodic reference signal comprises detecting the intersection between the current waveform of the converter leg and the reference waveform associated with the respective converter leg. Accordingly, a single reference signal can be used for detecting the intersections with the current waveforms of each of the converter legs, whereas only the relevant intersections with the reference waveform are considered. This allows synchronization of more complex current waveforms with a single reference signal.

Synchronization refers to the adjustment of the timing of the switching sequences of the converter legs, i.e., the delay between the switching sequences, such that the desired phase shift between the switching sequences is achieved, in particular a phase shift corresponding to the switching sequence period T divided by the number of converter legs (i.e., number of different phases).

In embodiments, the method may comprise counting the reference waveforms in the reference signal using a counter, associating each converter leg with a different count of the counter and detecting the intersection of the current waveform of a converter leg with the reference signal only for the reference waveform of the reference signal corresponding to the count associated with the respective converter leg. It may thereby be ensured that only the intersection of the current waveform with the desired reference waveform of the reference signal (in particular with the correct ramp) is detected. For example for three legs, the reference signal may include within a duration of one switching period three ramps associated with counts 1, 2, 3 (or a, b, c), and only intersections between the current waveform of leg 1 with a ramp of count 1, and respectively for legs 2, 3 with a ramp of count 2, 3, respectively, are considered.

In another example, a counter may not be used, but the intersection may be detected for the phase having the higher current, in particular the highest instant current. This may occur by determining the current waveform for which the intersection has been detected has the highest current value (within the period of the respective reference waveform) of the current waveform or has a current value above a threshold, and triggering the transition for the respective leg only if the detected intersection corresponds to a current waveform having the respective highest current value or current value above the threshold. Other intersections may thus be ignored. Such implementation does not require an additional counter.

The converter cell may comprise an inductor and plural (semiconductor) switches that are switchable to couple (in particular selectively connect) the inductor to terminals of the converter cell. The switching sequence may correspond to a modulation mode (which may be termed "three-stage conduction mode", TCM). In embodiments, the method may include controlling the current waveform of the inductor current for each converter leg in the modulation mode by controlling the transition between the switching states of the sequence, wherein the current waveform is controlled to include within one period of the current waveform a first section of a rising current corresponding to a first switching state, a second section corresponding to a second switching state, wherein the second section of the current waveform does not reach or cross a zero value of the current, and a third section of falling current corresponding to a third switching state. The current waveform is controlled so as to allow the length of the period of the current waveform to change. In other words, a frequency of the modulation of the inductor current is variable. The switching sequence may consist of the first, second and third switching states. Such TMC mode may allow an operation with low losses.

In an example, the converter cell may comprise first and second terminals on a first side of the converter cell and third and fourth terminals on a second side of the converter cell. The converter cell may include a first interconnection point between a first switch and a second switch or diode, the first switch and the second switch or diode being connected in series between the first and second terminals. A second interconnection point may be provided between a third switch or diode and a fourth switch, wherein the third switch or diode and the fourth switch are connected in series between the third and fourth terminals. An inductor of the converter cell may be connected between the first and second interconnection points. Accordingly, such converter cell may correspond to an H-bridge in which the inductor is connected in the middle. The power converter may further include a first capacitor coupled between the first and the second terminals on the first side and a second capacitor coupled between the third and fourth terminals on the second side of the converter cell. Such capacitor can maintain the output current while the inductor is being charged and provide smoothing.

In the TMC modulation mode, the first switching state may correspond to the first switch being in a closed state and the fourth switch being in a closed state, wherein the second switch or diode is not conducting, and the third switch or diode is not conducting. The second switching state may correspond to the first switch being in a closed state and the third switch or diode being in a conducting state (e.g., closed third switch), wherein the second switch or diode is not conducting and the fourth switch is not conducting (e.g., second and fourth switch open). The third switching state may correspond to the second switch or diode being in a conducting state and the third switch or diode being in a conducting state (i.e., second and third switch in closed state), wherein the first switch is not conducting and the fourth switch is not conducting (i.e., first switch and fourth switch in an open state). Such switching states allow an efficient generation of the current waveform of the inductor current, wherein the waveform and thus the different operating modes of the power converter can be controlled by controlling the transitions between these switching states. In the not conducting states, there is essentially no current flow through the respective switch or diode.

In a further aspect, a controller of a multi-cell switching power converter is provided, wherein the power converter comprises at least two converter legs connected in parallel and providing a phase shifted output current, each converter leg including at least one converter cell that is operated in accordance with a switching sequence that includes transitions between predetermined switching states and that generates a current waveform (in particular inductor current waveform) in the converter leg. The controller may be configured to perform any of the methods described herein. The controller may for example comprise a respective processing unit and a memory storing control instructions which when executed by the processing unit perform any of the methods described herein.

In particular, the controller may be configured to operate the power converter in an interleaving mode in which the switching sequence of each of the converter legs is phase-shifted with respect to the switching sequences of the one or more other converter legs so that each converter leg corresponds to a different phase of the switching sequence and the generated current waveform. The controller may include a reference signal generator configured to generate a periodic reference signal and may further include a trigger signal generator configured to detect an intersection between the current waveform of each switching leg and the periodic reference signal and, upon detecting the intersection of the current waveform of a converter leg with the reference signal, to trigger for this converter leg a transition to a predetermined switching state of a switching sequence. Such reference signal generator and trigger signal generator may be implemented as control instructions running on a processing unit, or may be implemented as respective chips, circuits, circuits elements or the like. The controller may further comprise respective interfaces, such as inputs for receiving measured signals and operating parameters, such as a set point for the converter operation (e.g., output reference current, power, ramp parameters, and the like), and outputs for giving out control signals to switches of the power converter, such as a control signal for driving semiconductor switches of the power converter.

In a further aspect, a multi-cell switching power converter comprising at least two converter legs connected in parallel and providing a phase-shifted output current is provided. The power converter may comprise a controller having any of the configurations described herein. The power converter may be a DC/DC power converter yet may also be implemented as an AC/DC power converter or a DC/AC power converter. The power converter may in particular be a multi-cell, bidirectional switched mode, DC/DC converter, and may for example be a cascaded bidirectional buck-boost converter. In other implementations, it may be a unidirectional power converter.

In a further aspect A computer program product, comprising a computer readable hardware storage device having computer readable program code stored therein, said program code executable by a processor of a computer system to implement a method for controlling the operation of a multi-cell switching power converter is provided, wherein the computer program comprises control instructions which, when executed by a processing unit of a controller of the power converter, cause the processing unit to perform any of the methods described herein. The computer program may be provided on a volatile or non-volatile data carrier or storage medium.

It should be clear that the method may be carried out with the controller in any of the configurations described herein. Further, the controller may be configured to perform any of the disclosed method steps.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 15 is a schematic diagram illustrating the synchronization of the current waveforms of three converter legs upon changing from buck operation to boost operation according to an example.

DETAILED DESCRIPTION

Figure 1:
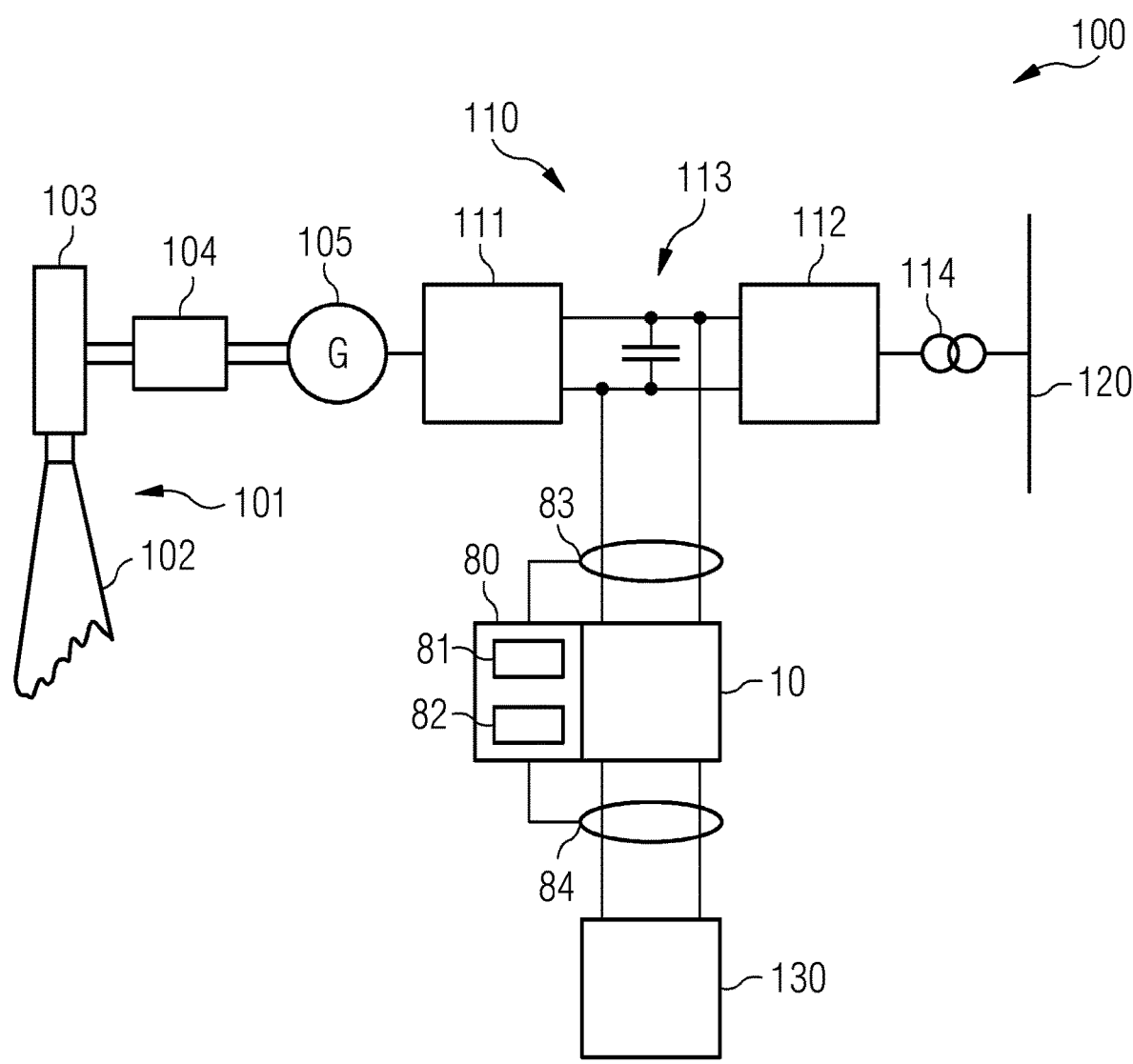
FIG. 1 is a schematic drawing showing a power converter in an exemplary application according to an example.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a," "an," and "the" are intended to include the plural forms as well, unless the context clearly indicates otherwise. The terms "comprising." "having." "including," and "containing" are to be construed as open-ended terms (i.e., meaning "including, but not limited to,") unless otherwise noted.

The terms "convert legs" may interchangeably used with "converter phase".

FIG. 1 illustrates schematically a power converter 10, which is a bidirectional DC-DC power converter, in an exemplary application in a wind turbine 100. Wind turbine 100 includes a rotor 101 with rotor blades 102 and rotor hub 103 that is coupled via an optional gearbox 104 to a generator 105. Electrical power generated by generator 105 is converted by the AC/AC converter 110 and fed via a transformer 114 to a power grid 120, which can be a local wind farm grid or a utility grid or the like. The AC/AC power converter 110 includes a grid side converter 112 and a generator side converter 111 that are coupled by a DC-link 113. The DC-DC converter 10 may be used to couple an energy storage device 130 to the DC link 113. The energy storage device 130, such as a battery, may thus be provided with the correct DC voltage level for either charging or discharging the storage device, wherein the power converter 10 provides bidirectional power flow to either extract electrical energy from DC-link 113 during charging or to supply electrical energy to DC-link 113 during discharging. It should be clear that this is only an exemplary application, and that the power converter 10 can be used in any suitable application, for example on different power system topologies, on solar power generating devices, and in other applications, where bidirectional DC-DC power conversion is required. In other applications, power converter 10 may be implemented as an AC-DC power converter.

Power converter 10 may need to step up or step down the voltage and may therefore be implemented as a cascaded buck-boost converter. Such power converter may be operated in different modulation modes, whereas known modulation modes are the continuous conduction mode (CCM) or the boundary conduction mode (BCM). The power converter 10 may further be operated in a modulation mode in which the current waveform of the inductor current has three sections, which may therefore be called "three-stage conduction mode" (TCM), which is described in more detail further below.

Figure 2:
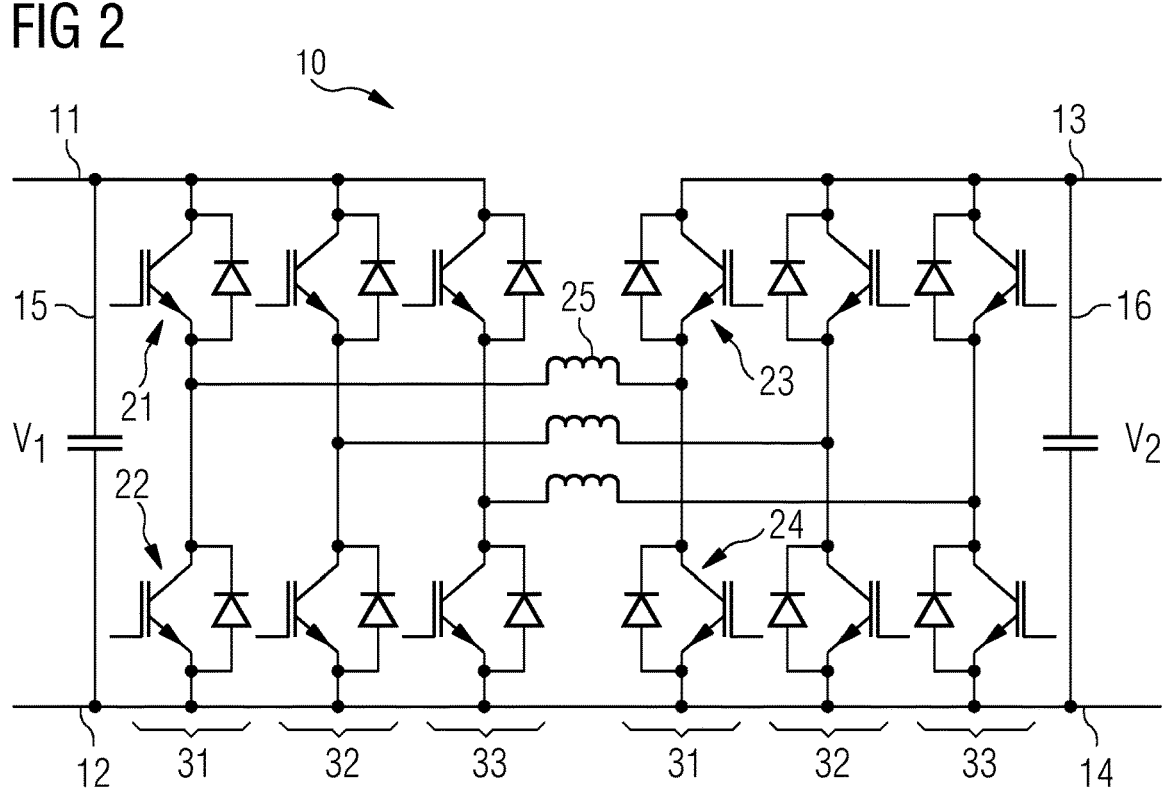
FIG. 2 is a schematic drawing showing a power converter according to an example.

FIG. 2 schematically illustrates a possible implementation of power converter 10 that includes three converter legs 31, 32, 33, each comprising a converter cell 20. Each converter cell 20) includes semiconductor switches 21, 22, 23, 24 and an inductor 25. A capacitor 15 is further coupled between first and second terminals 11, 12 on a first side of the power converter and a further capacitor 16 is coupled between the third and fourth terminals 13, 14 of a second side of the power converter. In the example of FIG. 2, three converter cells are connected in parallel between the converter terminals (i.e., the respective terminals of the converter cells 20 are connected together), and they may be operated in an interleaving manner in which the inductor currents through the respective inductors 25 are phase-shifted (e.g., by about 120°), thus improving the output quality and reducing the filtering requirements for the converter output. Current through the inductor 25 may thus also be termed "phase current", as the three converter cells essentially correspond to three phases.

Figure 3:
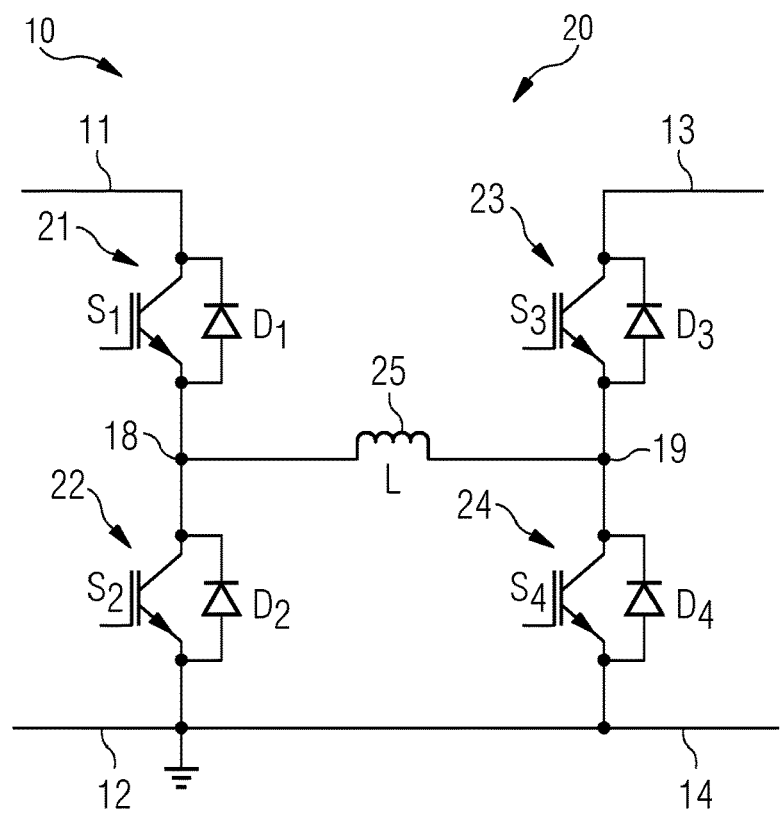
FIG. 3 is a schematic drawing showing a converter cell of a converter leg of the power converter of FIG. 2.

A converter cell 20 of power converter 10 is illustrated in more detail in FIG. 3. First and second switches 21, 22 (S1, S2) which comprise the body diodes D1, D2 are connected in series between first and second terminals 11, 12. Third and fourth switches 23, 24 (S3, S4) that include the body diodes D3 and D4 are connected in series between the third and fourth terminals 13, 14. Between the interconnection points 18, 19, the inductor 25 having inductance L is connected. Cell 20 can now be operated in a sequence of switching states, wherein each switching state defines which switches S1 to S4 are opened or closed, thereby controlling the current flow through the power converter. A switching state may thus also be termed "conduction scheme". The power converter 10 of the example of FIGS. 2, 3 provides bidirectional power flow. It may also be implemented as a unidirectional power converter, wherein switches S1 and S4, or S2 and S3, may be substituted by simple diodes, depending on the direction of the intended power flow. The general principle of operating such a switching power converter is known and will thus not be explained in greater detail here.

The switches are semiconductor switches and are implemented as IGBTs. Other configurations are conceivable, such as using MOSFETs, thyristors, or the like.

Power converter 10 may include a controller 80 that controls the switching of the switches in accordance with a predetermined sequence of switching states, which controls the waveform of the current through inductor 25. As illustrated in FIG. 1, the controller 80 may include a processing unit 81 and a memory 82 that stores control instructions which are executed by processing unit 81. Processing unit 81 may for example include a digital signal processor, an application specific integrated circuit, a field programmable gate array, a microprocessor or the like. Memory 82 may include RAM, ROM, Flash Memory, a hard disk drive and the like. Controller 80 may make voltage measurements and/or current measurements 83, 84 on either side of power converter 10 or may receive respective measurement data, which is used in the control as explained further below. Controller 80 may further measure the inductor current through the inductor 25 of each converter cell 20 (or may receive respective measurements).

In FIG. 2, the power converter 10 includes three converter legs 31, 32, 33, each comprising one converter cell, with its respective switches 21 to 24 and inductor 25. It should be clear that power converter 10 may include a different number of converter legs, such as two, three, four, five or even more converter legs, and that each converter leg may include more than one converter cell, e.g., for increasing the power rating of the converter. Power converter 10 is operated in an interleaving mode in which each converter leg 31, 32, 33 is operated with a different phase shift of the switching sequence, resulting in the current waveforms (inductor current waveform and output current waveform) of each converter leg being phase-shifted with respect to the current waveforms of the other converter legs. As indicated above, such interleaving operation is relatively simple to implement with a constant switching frequency (i.e., a constant period of the switching sequence or current waveform) but is difficult to implement for operation with variable frequency.

Figure 4:
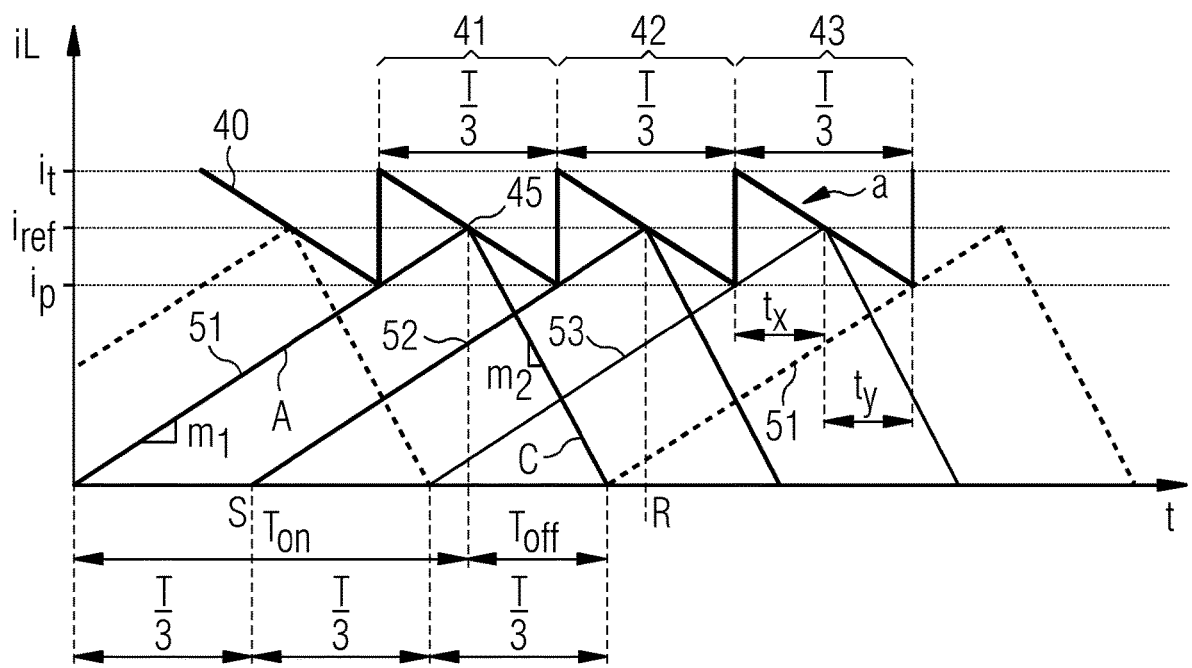
FIG. 4 is a schematic diagram illustrating the intersection of a current waveform of an inductor current of a converter leg with a reference signal according to an example.

The present disclosure provides a solution to achieve accurate and correct interleaving operation between the converter legs of the power converter 10 that is robust and requires low computational effort and which allows the modulation mode to have a variable frequency. Furthermore, it is relatively immune to component tolerances and does not require a master phase for operation. FIG. 4 illustrates schematically an exemplary implementation of the respective solution.

In the example of FIG. 4, the power converter 10 comprises three legs and is operated in a BMC modulation mode. FIG. 4 shows a diagram illustrating the inductor current iL over time, wherein the current waveforms 51, 52, 53 are obtained in the three converter legs 31, 32, 33. The period of the switching sequence and thus of the current waveform is T. Section A of the current waveform 51 corresponds to a particular switching state of the respective converter cell resulting in a rising current, and section C of inductor current waveform 51 corresponds to a further switching state resulting in a falling current. The BMC-modulation mode thus includes two sections in the current waveform and transitions to the next current waveform upon the inductor current reaching a zero value, which may for example be detected by a zero-crossing detector (ZCD). The slope of the first section A is m1 and the slope of the second section C is m2. The desired phase shift between the different converter legs and thus between waveforms 51, 52, 53 is T/3.

To achieve such phase shift, a reference signal 40 is generated and is used to trigger the transition between a first switching state corresponding to section A and a second switching state corresponding to section C of the current waveform. The reference signal 40 has a periodicity of the period T of the switching sequence divided by the number of different phases, i.e., the number of converter legs, which is T/3 in the present example. The reference signal 40 thus includes within one period T three reference waveforms 41, 42, 43 (i.e., three essentially identical waveforms), which are in the example of FIG. 4 provided as leading-edge ramps. The reference waveforms may in other implementations have a different shape and may also take the form of a trailing edge ramp, depending on the operating mode as shown in more detail further below. The reference signal 40 is thus a sawtooth-shaped carrier signal which has a frequency that is equal to n times the switching frequency of the power converter 10, wherein n is the number of converter legs (i.e., the number of different phases).

An intersection 45 between the current waveform 51 and the reference signal 40 is now detected to generate a trigger event for triggering the transition from the first switching sequence to the second switching sequence of the converter cell of the respective converter leg, i.e., for transitioning from section A to section C of the current waveform 51. As the current waveform of each converter leg is intersected with the same reference signal 40 at the given periodicity, the desired phase delay of T/3 will be established naturally between the current waveforms 51, 52, 53.

In particular, in accordance with an operating point of the power converter, switching occurs at a reference value iref for the inductor current iL, which determines the period T of the switching sequence and the current waveform. As can be taken from FIG. 4, if the switching sequence corresponding to waveform 51 would be too late, the intersection 45 would occur at a later part of the ramp and thus at a lower current value of iL, resulting in a shorter duration of the waveform 51. Accordingly, the subsequent waveform 51 starts earlier, so that the intersection will already be closer to the reference value iref. After only a few cycles, the intersection 45 thus settles at iref. This occurs for each of the phases, so that there is the desired phase shift between the phases and the transition to section C is triggered at iref for all phases. If the period T changes, e.g., by adjusting iref, the period T/3 of reference signal 40 changes correspondingly, and the intersections 45 will converge to the new iref value.

In the example of FIG. 4, the current waveforms 51 to 53 of the inductor current are given as current values and reference signal 40 is accordingly likewise provided as current values. It should however be clear that voltage values may equally be used, for example when obtaining a voltage value from a current sensor measuring the inductor current, such voltage value may then be compared to a reference signal 40 provided as a voltage reference signal.

The reference signal 40 is generated by providing a ramp from an upper limit $i_t$ to a lower limit $i_p$ with slope a and re-setting the ramp to the upper limit $i_t$ upon reaching the lower limit $i_p$ (and vice versa when generating a trailing edge ramp). The respective parameters that define the reference signal 40 can be established based on the operating set point (in particular the references) of the power converter and respectively measured values. In particular, the values of $i_t$ and $i_p$ can be calculated from the reference iref that can be imposed by the converter controller in accordance with the respective operating conditions. The determination of these values is described below with respect to the example of FIG. 4 but may be applied correspondingly to other types of current waveforms and to converters having a different number of converter legs.

The period T/3 of the reference waveform (the ramp) can be divided into sections $t_x$ and $t_y$ before and after the ramp reaching the value iref, and the limits $i_t$, $i_p$ can be calculated based on iref:

$$t_x + t_y = T/3 \quad \text{(equation 1)}$$

$$i_t = iref + a * t_x \quad \text{(equation 2)}$$

$$i_p = iref - a * t_y \quad \text{(equation 3)}$$

wherein a is the slope of the ramp. The ramp reaches iref in its center if $$t_x = t_y = T/6 \quad \text{(equation 4)}$$

The period of the switching sequence and thus of current waveform 51, when triggering at iref, is:

$$T = T_{on} + T_{off} \quad \text{(equation 5)}$$

$$m_1 * T_{on} = iref \quad \text{(equation 6)}$$

$$m_2 * T_{off} = iref \quad \text{(equation 7)}$$

The slope $m_1$, $m_2$ of the respective section A, C of the current waveform 51 can be obtained based on the input/output voltage $V_{in}/V_{out}$ and the measured inductance L of the inductor of the converter cell, e.g., as $m_1=V_{in}/L$ and $m_2=V_{out}/L$; the slope may also be measured. Based on equations 5-7, it can be derived that $$T = iref * (1/m_1 + 1/m_2) \quad \text{(equation 8)}$$

Based on the above equations, the values for the upper and lower limits of the ramp can be derived. As can be seen, there is a degree of freedom that can be chosen, which is the slope of the ramp a (or in other words, the distance of the limits from the reference value iref). A suitable choice for the slope a of the ramp is $a=m_1$, since it offers a good compromise when the values of $i_p$ and $i_t$ are calculated and provides good convergence to the desired phase shift. Using equation 4 and substituting into equations 2 and 4, the limits of the ramp can be derived:

$$i_t = iref + m_1 * T/6 \quad \text{(equation 9)}$$

$$i_p = iref - m_1 * T/6 \quad \text{(equation 10)}$$

Accordingly, the variables $T_{on}$ and $T_{off}$ are calculated in order to obtain the period T. The slope $a=m_1$ and the limits $i_p$ and $i_t$ can then be calculated. Based on the limits $i_t$, $i_p$ and the slope a, the ramp can be generated (ramping from $i_t$ to $i_p$ with slope a, or vice versa). As can be seen from the above equations, the ramp will have a period of T/3, resulting in a synchronization of the three phases of the three converter legs to a phase shift of T/3. Again, it is emphasized that the use of three converter legs is only an example, and that a different number of converter legs may be employed.

During operation, the parameters of the compensation ramp (in particular slope a, upper and lower limits it, ip) can be modified dynamically in accordance with the characteristics and the operating point of the power converter, such as input voltage and output voltage, and they depend on characteristics of the power converter, in particular the inductance value. The inductance L may be determined in different ways: L may be measured after the power converter is manufactured, L may be measured by the control unit, or the slope of the current may be measured to derive L, which may occur at the beginning of the converter operation or even cycle by cycle of the switching sequence, or every n switching cycles (wherein n may be 2, 3, 4, . . . , depending on the desired frequency of measurement). Another possibility is to embed a Hardware In the Loop (HIL) in the controller, e.g., a FPGA, to estimate the current and adjust the value of L, by comparison between the current emulated by the HIL and the measured current. Other known methods may be employed to determine L. Accordingly, L can be measured or estimated accurately, and the inductor is configured so that L is constant over the entire current range over which the converter operates.

As explained further below, a regulator such as a PI-controller, may for example be used to define at least one parameter, such as the current reference iref, in accordance with the current and power set points provided to the converter control, and changes thereto may accordingly result in changes to the reference signal 40. As an example, if iref is set to a higher value, $T_{on}$ and $T_{off}$ will increase, resulting in a larger period T of the switching sequence/current waveform 51, and further resulting in a corresponding modification of the reference signal 40. However, as the triggering of the transition in the switching sequence is determined by the intersection 45 with the reference signal, such adaptation of the reference signal 40 will result in a fast convergence of the timing of the switching sequences for the different converter legs such that the correct phase shift for the new period T is achieved (which is explained in more detail further below). Accordingly, a solution is provided that allows a fast, efficient and robust synchronization of the different phases of a multi-cell power converter, wherein the switching frequency of the power converter is variable, and the phase shift between the different converter legs will be adapted automatically to the correct values. The control works independently for each phase or converter leg, and it is accordingly not sensitive to small differences between component values in the different converter legs, e.g., due to tolerances. In embodiments, the method is thus simple and robust in operation.

In the example of FIG. 4, a single periodic reference signal having the same repeating reference waveform is used (i.e., a single repeating ramp of the same parameters). It is also conceivable to use a reference waveform with different parameters or a different reference waveform for each converter leg, i.e., waveforms 41, 42 or 43 may for example have a different $i_t$, $i_p$ and/or slope a. The slope a can for example be derived independently for each converter leg, using the values measured for the respective converter leg. This is beneficial if inductance tolerances or component drift cause significant mismatch in the slopes of the currents for the different converter legs.

Figure 5:
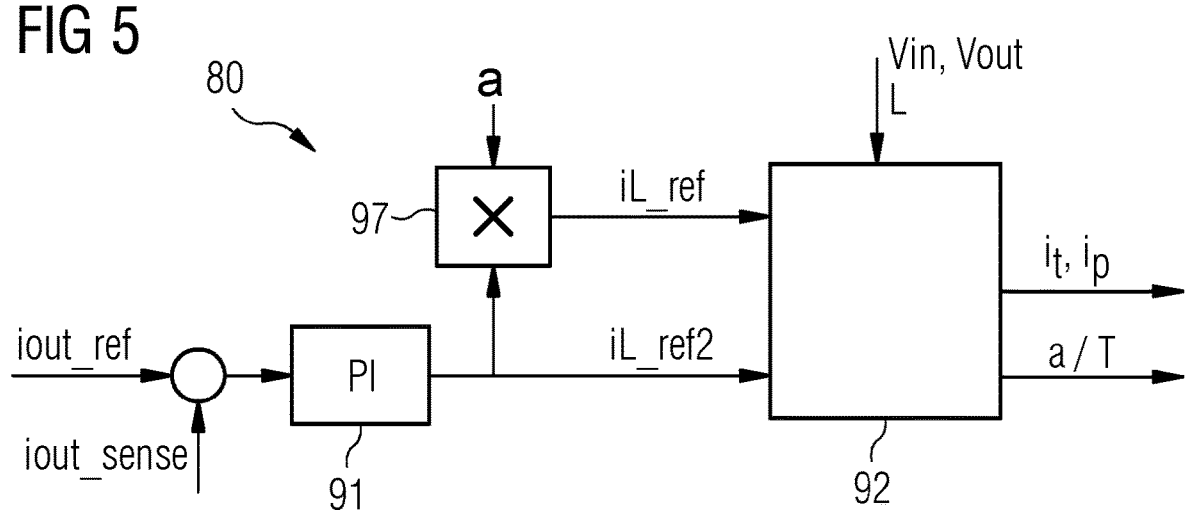
FIG. 5 is a schematic drawing showing a part of a controller according to an example.
Figure 6:
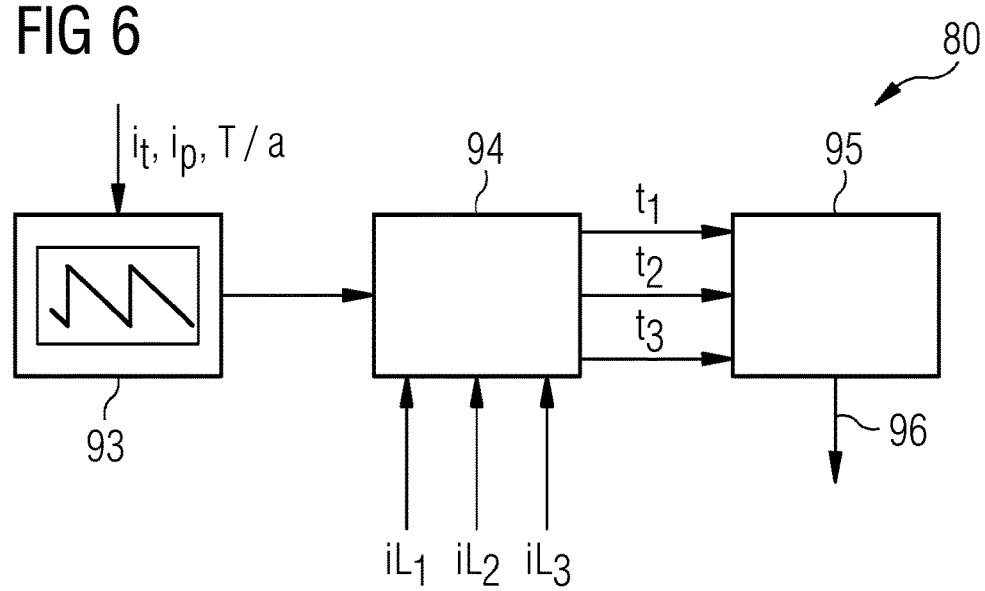
FIG. 6 is a schematic drawing showing a part of a controller according to an example.

FIGS. 5 and 6 illustrate components that may be implemented in the controller 80 of power converter 10 to implement the respective solution. The power converter 10 is controlled in accordance with a reference iout_ref for the output current of the power converter, wherein the output current iout_sense is measured and subtracted from the reference value. The resulting error signal is provided to a PI (proportional integral)-controller 91, which derives therefrom a reference value iL-ref2 for the inductor current, upon the reaching of which the switching sequence transitions into a new switching state, e.g., from the switching state corresponding to section A to the switching state corresponding to section C of current waveform 51 of FIG. 4. Element 97 shown in FIG. 5 is provided for generating a second current reference that is relevant for a different modulation scheme, and it may accordingly not be present in a controller that implements the BCM modulation mode illustrated in FIG. 4. The reference iL-ref2 of FIG. 5 may accordingly correspond to iref shown in FIG. 4. A calculation unit 92 receives the reference iL-ref2 and furthermore receives respective measurement values, such as Vin, Vout, inductance L and the like that are required for calculating the limits, slope and period of the reference signal 40, in accordance with the equations provided above. It should be clear that the reference waveform is uniquely determined by either $i_t$, $i_p$ and a, or $i_t$, $i_p$ and T. The respective values are provided to a ramp generator 93 which uses these values to generate the reference signal 40 as a saw tooth signal, as explained in detail above. The ramp signal is then provided to a trigger signal generator 94. Trigger signal generator 94 receives measurements of the inductor current $iL_1$, $iL_2$, $iL_3$ of the respective converter leg 31, 32, 33. Trigger signal generator 94 furthermore detects the intersection 45 of the respective inductor current with the reference signal 40. Upon detecting the intersection 45, the trigger signal generator generates a respective trigger t1, t2, t3 for the respective converter leg 31, 32, 33, in particular for triggering the transition to the next switching state of the switching sequence. Modulator 95 receives the respective trigger signals and gives out a control signal 96 in accordance with which the switches of the converter cells of the converter legs 31, 32, 33 are controlled in order to effect the transition for the respective converter leg to the next switching state.

It is noted that FIGS. 5 and 6 illustrate a common control for the three phases of the power converter. It is however also possible to provide an independent control for each phase, for example by providing the control structures of FIGS. 5 and 6 for each converter leg 31, 32, 33. In each control structure, $i_t$, $i_p$ and slope a may then be determined for the respective converter leg, and they may be different for each converter leg. The respective ramps (reference waveforms) may then be joined to synthesize an asymmetrical sawtooth signal, i.e., reference waveform 41 may be different from reference waveform 42, which may be different from reference waveform 43. The reference signal would then still include a reference waveform for each converter leg, and subsequent reference waveforms may have a corresponding ramp shape but different ramp parameters.

Figure 7:
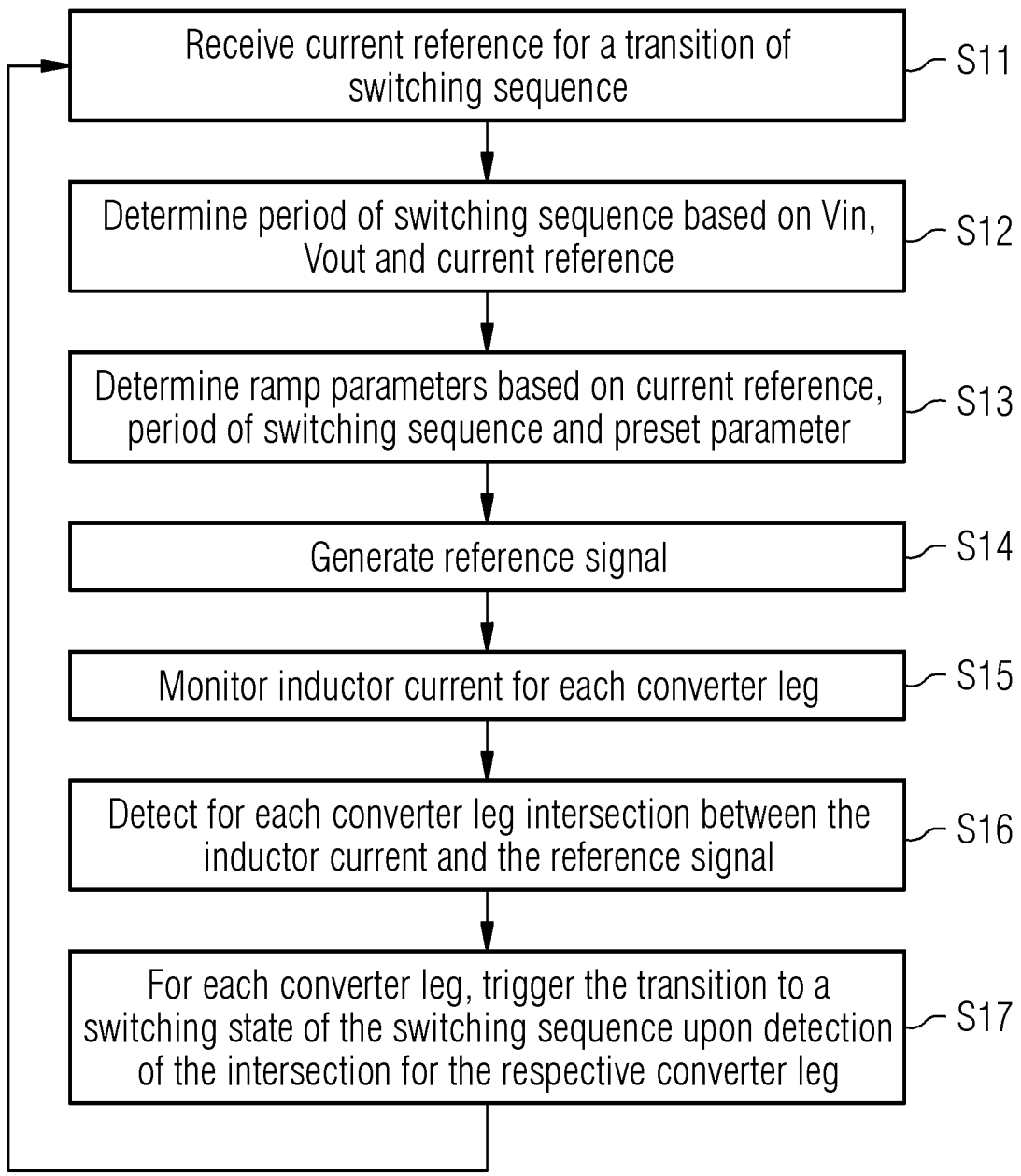
FIG. 7 is a flow diagram illustrating a method according to an example.

FIG. 7 is a flow-diagram illustrating a method according to an example. In step S11, the current reference iref for a transition of the switching sequence, e.g., for the transition from section A to section C of current waveform 51, is received, for example from the PI-controller 91. In step S12, the period of the switching sequence is determined based on Vin, Vout and the current reference, for example as explained above with respect to equation 5. In step S13, the ramp parameters are determined based on the current reference iref, the period T of the switching sequence and pre-set parameters, such as the slope a (which may be selected as corresponding to m1, as outlined above). The ramp parameters may thus be determined in accordance with equations 9 and 10 given above. In step S14, the reference signal is generated, e.g., by ramp generator 93. The inductor current for each converter leg is monitored in step S15, and the intersection between the inductor current and the reference signal is detected for each converter leg in step S16, e.g., by the trigger signal generating unit 94. Upon the detection of the intersection for a converter leg, the transition to a predetermined switching state of the switching sequence is triggered for this respective converter leg in step S17. With reference to FIG. 4, the transition from the switching state corresponding to section A of the current waveform to the switching state corresponding to section C of the current waveform is triggered. In embodiments, the method may then continue in step S11. Accordingly, by such method, the reference signal can be generated continuously in real-time and can consider changes to the operating point of the power converter. For example, if the reference current iref changes, the reference signal 40 is directly effected in accordance with equations 9 and 10. If the input voltage changes, the slope m1 changes and correspondingly the period of the switching sequence. Furthermore, output voltage changes are considered through the switching period T. Consequently, the reference signal and in particular the ramps of reference waveforms 41, 42, 43 are dynamically adapted to new operating conditions.

Figure 8:
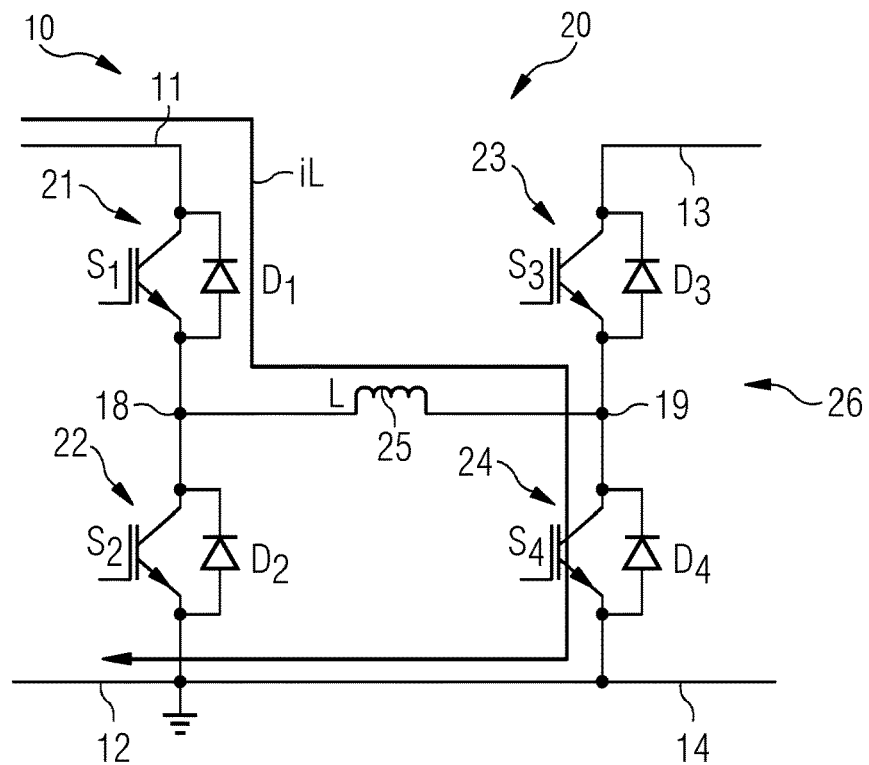
FIG. 8 illustrates a sequence of switching states of a power converter operating in a TCM modulation mode according to an example.
Figure 9:
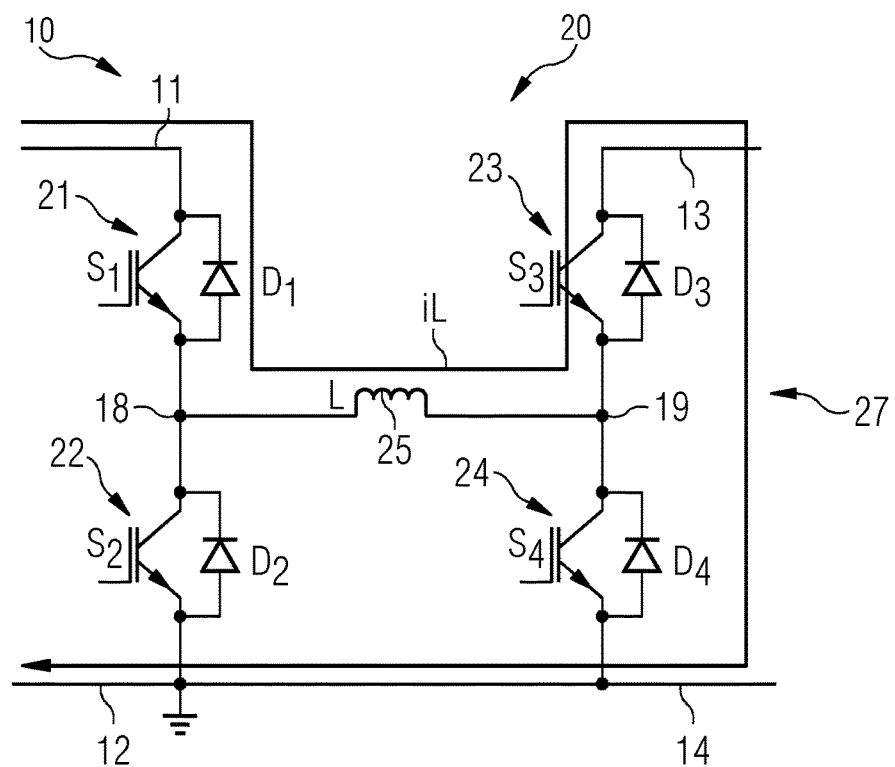
FIG. 9 illustrates a sequence of switching states of a power converter operating in a TCM modulation mode according to an example.
Figure 10:
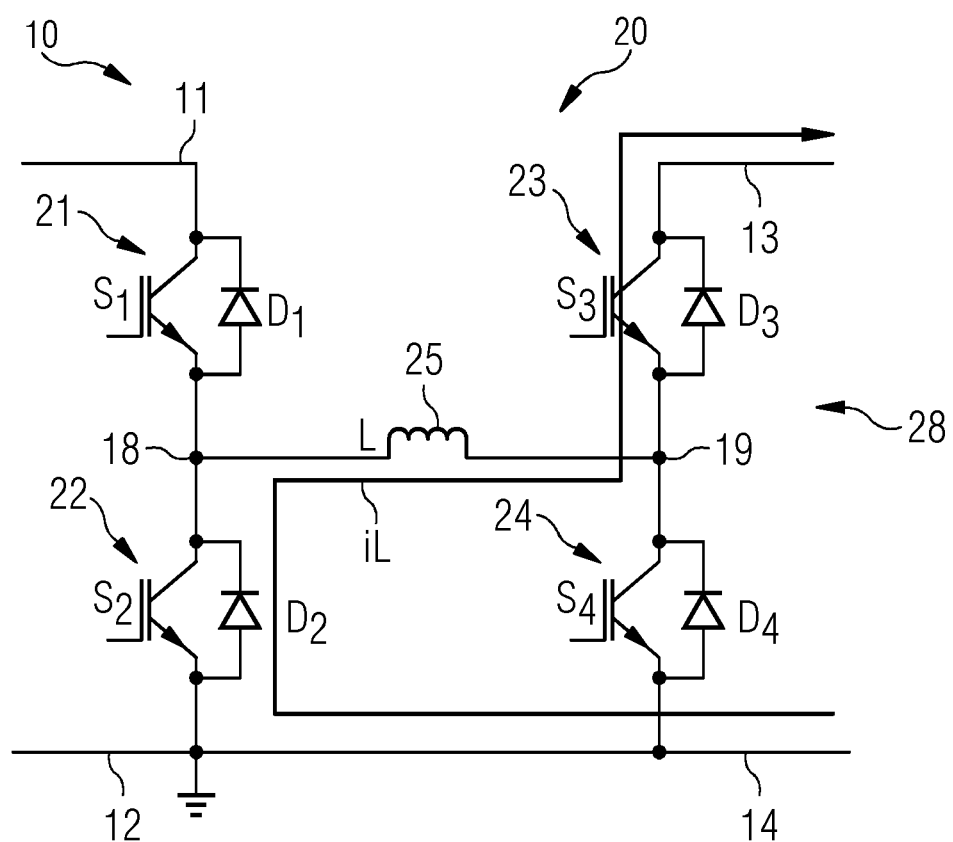
FIG. 10 illustrates a sequence of switching states of a power converter operating in a TCM modulation mode according to an example.

The above examples are described with respect to the BCM-modulation mode, which is commonly known and thus not explained in greater detail here. In embodiments, the method can likewise be employed with other modulation modes. FIGS. 8 to 10 show the switching states of a switching sequence of a three-stage conduction mode (TCM) that can be used with embodiments of the present invention, in particular with the power converter or FIGS. 2 and 3. The TCM mode provides bidirectional power flow and buck/boost operation, wherein losses in the switches of the converter cell can be reduced by reducing the RMS current of the current waveform and by providing switching at current zero crossing. Furthermore, reduced maximum currents of current waveform likewise result in reduced switching and conduction losses, for example reduced reverse recovery losses of the body diodes of the switches of the converter cell.

Figure 11:
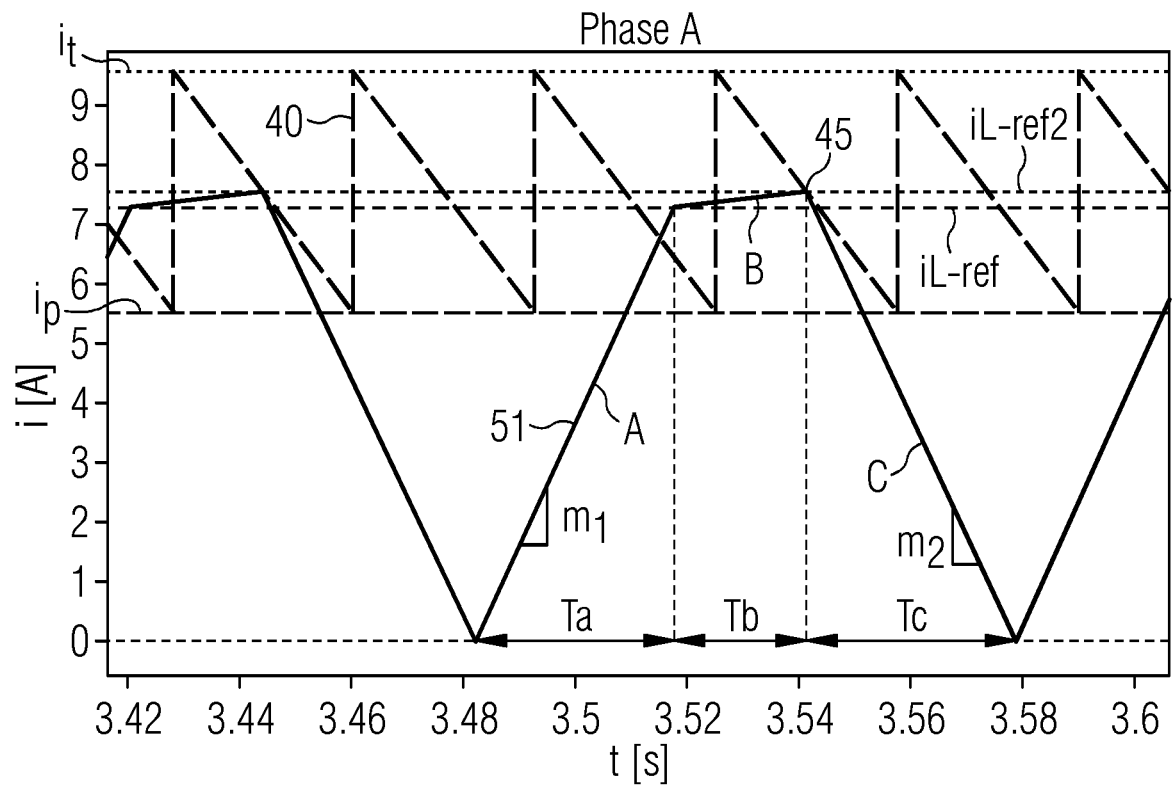
FIG. 11 is a schematic diagram illustrating the intersection of a current waveform of an inductor current of a converter leg corresponding to the TCM modulation of FIGS. 8-10 with a reference signal according to an example.

FIG. 8 illustrates a first switching state 26 in which switches S1 and S4 are closed and the current iL is shown by an arrow, corresponding to section A of current waveform 51 of FIG. 11. In this state, the load is supplied with current from the capacitor 16 (FIG. 2). After a fraction Ta of the period T of the current waveform, the second switching state 27 illustrated in FIG. 9 is applied. In particular, switch S4 is opened and S3 is closed, causing the current to flow via the load and charging capacitor 16. Depending on input voltage V1 and output V2, the voltage applied by the inductor 25 in the switching state 27 of FIG. 9 causes the inductor current iL to either rise (buck mode) or fall (boost mode). This is illustrated in the section B of the current waveform 51 in FIG. 11, wherein the rising current indicates operation in the buck mode. After time Tb, operation transitions from the second switching state 27 of FIG. 9 to the third switching state 28 of FIG. 10, wherein the first switch 21 is opened and the second switch 22 is closed, resulting in a current flow via diodes D2, D3 through inductor 25. The inductor 25 supplies the stored energy to the load and is essentially discharged, resulting in the falling current illustrated in section C of current waveform 51. After the third switching state 28 of FIG. 10, the switching sequence ends and is repeated, resulting in a periodic waveform of the inductor current iL with the period T=Ta+Tb+Tc, corresponding to the duration of the switching sequence.

The transition from the third switching state 28 of FIG. 10 to the first switching state 26 of FIG. 8 of the next period, i.e., from section C to section A of the next period of the current waveform 51, may for example occur upon the inductor current iL reaching a zero value. Zero current detection (ZCD) may therefore be employed. The current waveform 51 may thus consist of the sections A, B and C within one period T. The switching sequence may consist of the first, second, and third switching states 26, 27, 28 illustrated in FIGS. 8 to 10. As illustrated in FIG. 11, there is no reversal of the inductor current iL during the period T of the current waveform 51. Furthermore, there are no additional sections (corresponding to additional switching states) between sections A, B, C of the current waveform. Accordingly, if the time Ta, Tb or Tc (i.e., the duration) of the respective section A, B, C of the current waveform 51 is changed, the period T of the current waveform and thus the frequency of the current modulation changes. This occurs for all phases (converter legs). The period of the reference signal 40 is adapted accordingly, and the different phases are synchronized again by the reference signal 40.

FIG. 11 illustrates the inductor current waveform 51 of one converter leg. Current waveforms for the other converter legs are not shown for the purpose of clarity. The intersection with the reference signal 40 that is detected in the example of FIG. 11 is the intersection 45 with the intermediate section B of current waveform 51. The transition that is triggered is the transition to the switching state corresponding to the section C of falling current of waveform 51. In other words, the transition from switching state 27 of FIG. 9 to switching state 28 of FIG. 10 is triggered upon the intersection of waveform 51 with reference signal 40 at intersection point 45. As can be seen from FIG. 11, there may be further intersections between current waveform 51 and reference signal 40, which are excluded as described further below. Section A of a rising current has again slope m1, and section C of a falling current has again slope m2, so that times corresponding to $T_{on}$ and $T_{off}$ can be determined. The equations given above are thus equally applicable to the current waveform 51 with the addition of the time period Tb for the intermediate section B of the current waveform. The transition from section A to section B of current waveform 51 occurs at the current reference iL-ref, whereas the second transition from section B to section C occurs at the current reference iL-ref2, which corresponds to the above-mentioned current reference iref and which is used in the determination of the parameters for the reference signal 40, i.e., for $i_t$ and $i_p$. The control 80 may determine the further reference iL-ref by multiplier 97 multiplying the reference iL-ref2 by a factor α: iL-ref=iL-ref2*α. Parameter α may be an optimization coefficient and may be selected from the range of 0) to 1. The higher factor α is selected, the higher the switching frequency becomes, and the more similar the waveform becomes to the BCM waveform. However, the higher α is selected, the lower the efficiency of the converter will be (due to higher maximum currents and RMS currents in current waveform 51). As the inductor current at start and end of section B of current waveform 51 are known, and the slope of the section B can be determined based on input and output voltages and the inductance L, the duration Tb of section B can be determined. Accordingly, also for waveform 51, it is possible to derive the period T of the waveform and thus of the switching sequence from respective operating parameters and measurements. It should be noted that besides employing the parameter α to set the relationship between iL_ref and iL_ref2, it would likewise be possible to set the period Tb (duration of second section B) and then derive iL_ref from iL_ref2 using the preset value for Tb.

Figure 12:
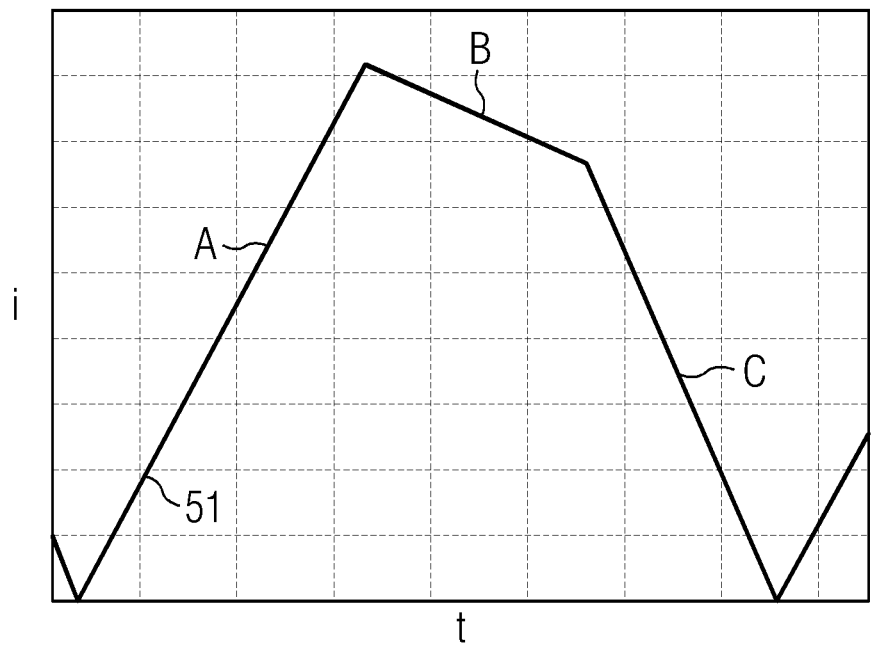
FIG. 12 is a schematic diagram illustrating the current waveform of the power converter using TCM modulation when operating in a boost mode.

FIG. 11 illustrates an operation in a buck mode in which the reference iL-ref for the first transition from section A to section B is lower than the reference iL-ref2 for the transition from section B to section C of the current waveform. As illustrated in FIG. 12, the power converter using the TCM-modulation mode can also be operated in a boost mode in which the current reference for the first transition A to B is set higher than the current reference for the second transition from B to C. In the boost mode, the value of parameter α is set to the inverse of the one corresponding to the buck mode. Again, it is noted that instead of setting α, the duration Tb of section B may be set. In the boost mode, the intersection to be detected for triggering the transition may still be the intersection of the intermediate section B of the current waveform with the reference signal 40. However, in such case, as section B corresponds to a falling current, the reference signal 40 may be provided as a sequence of trailing edge ramps in order to ensure conversions to the desired phase shift and to provide a proper intersection between current waveform 51 and the reference signal 40.

Figure 13:
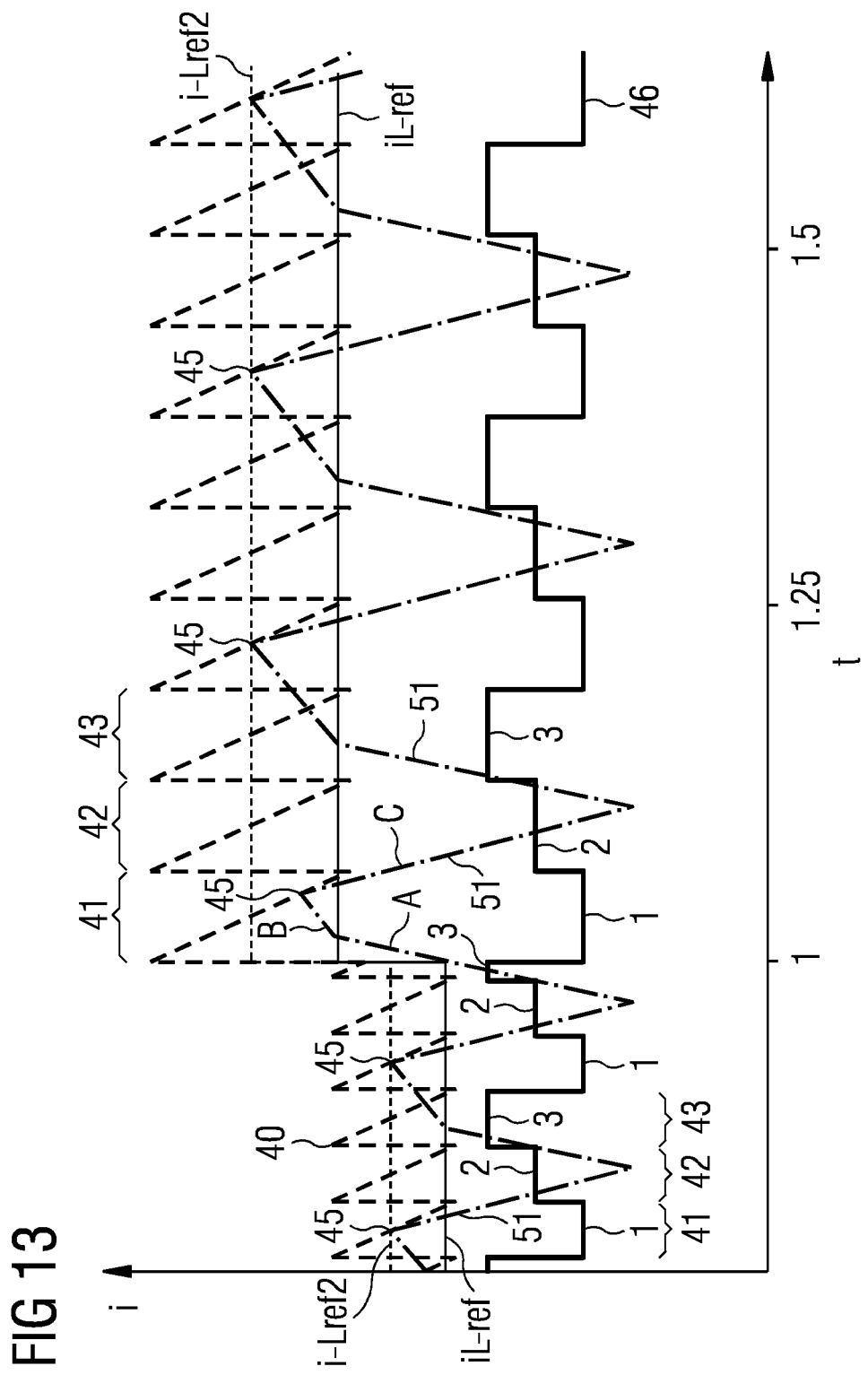
FIG. 13 is a schematic diagram illustrating the synchronization of the current waveforms of three converter legs upon occurrence of a step change of the current reference according to an example.

FIG. 13 is a diagram that shows the reference signal 40 and the current waveform 51 when operating the power converter 10 in the TCM modulation mode and a change of the current reference iref (=iL-ref2 for such modulation) occurs. As can be seen on the left-hand side of the figure prior to time T=1, the timing of current waveform 51 has converged so that the intersection between the current waveform and the reference signal 40 occurs at point 45, which corresponds to the current reference iref=iL-ref2. The first transition from section A to B of the current waveform occurs at the reference iL-ref. At T=1, a step change is applied to iL-ref2, and as illustrated in FIG. 5, a corresponding change therefore occurs to the reference iL-ref. Accordingly, as explained above with respect to equations 1 to 10, the parameters of the reference signal 40 are changed accordingly, and in particular the upper and lower limits $i_t$, $i_p$ change in accordance with equations 9 and 10. It should further be clear that in view of the change of the current limits, the period T of the resulting current waveform can be estimated and the reference signal 40 can again be adapted so that each reference waveform 41, 42, 43 corresponds to T/3. After the step change, the transition from section A to section B of the current waveform is again triggered when reaching the new iL-ref, whereas the transition to section C is triggered upon the intersection 45 of section B of the waveform with the reference signal 40. Intersection 45 is later than the intended timing of the transition and thus, due to the ramp, occurs at a lower current value. Correspondingly, the duration of section C is shorter, so that the next current waveform 51 starts earlier. As can be seen, the next intersection 45 occurs almost at the desired value of iL-ref2 so that the timing has almost converged to the desired phase shift. The third intersection 45 then already lies at the correct timing and occurs at the reference current level iL-ref2. The same occurs for the current waveforms of the other converter legs (not shown), so that after two or three intersections with reference signal 40, the correct timing and phase shift between the different converter legs is established.

FIG. 13 further illustrates a counter 46 that counts the reference waveforms 41, 42, 43, so that each reference waveform 41, 42, 43 is associated with a respective count 1, 2, 3. For the current waveform of the first converter leg 31, only intersections with the reference waveform 41 corresponding to the first count 1 may be considered, and similarly, for converter legs 32, 33, only intersections with reference waveforms 42, 43 corresponding to counts 2, 3, respectively, are considered. Accordingly, it can be ensured that while the same reference signal 40 is used for detecting the intersection with the current waveform of each converter leg, only the correct intersections are considered (for example, the intersections of current waveform 51 with the reference waveform 43 are not considered). It should be clear that such counting scheme is applicable to any type of current waveform (e.g., to the one of FIG. 4), and is further applicable to any number of converter legs and thus phases. Other schemes may be employed. For example, the phase may be switched for which the inductor current waveform has the higher current in the interval of the respective reference waveform.

Figure 14:
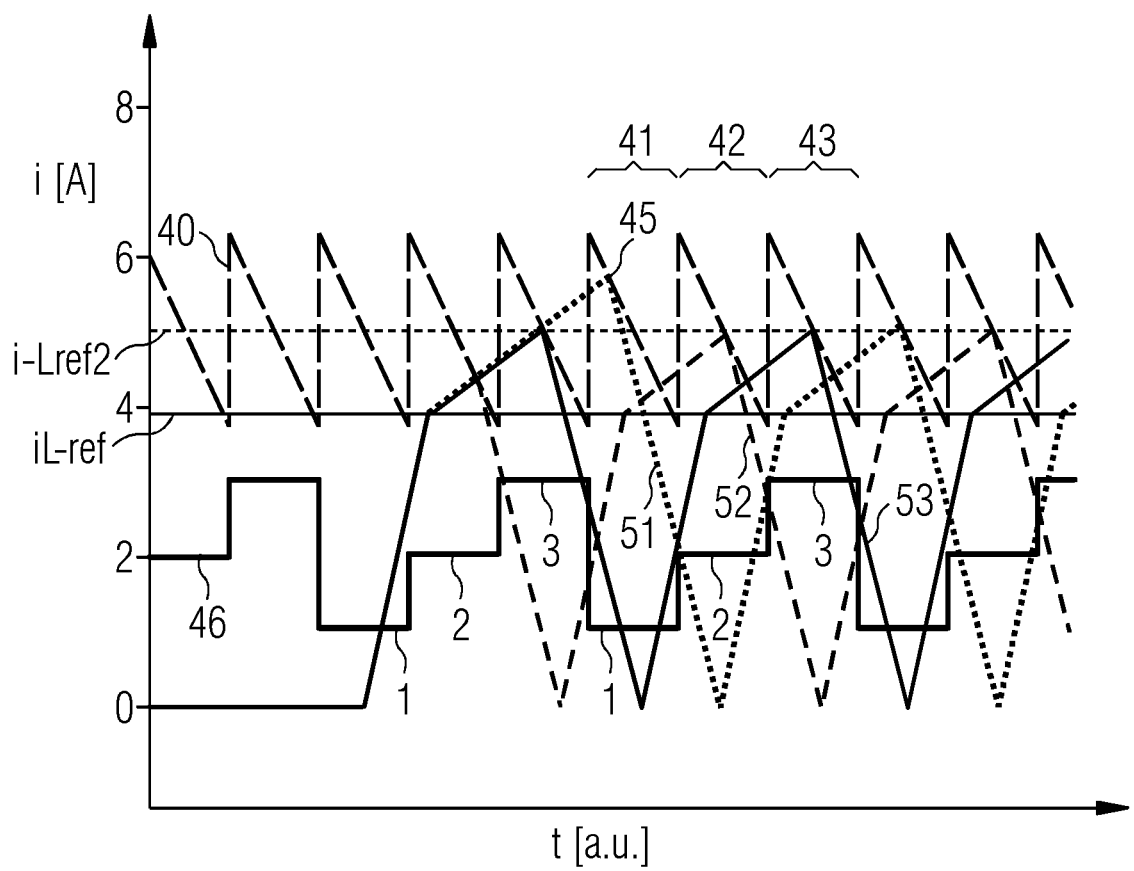
FIG. 14 is a schematic diagram illustrating the synchronization of the current waveforms of three converter legs upon startup according to an example.

FIG. 14 is a diagram that illustrates the synchronization of the current waveforms of a power converter having three converter legs upon startup. Again, the current reference iref=iL-ref2 may be given by the controller as illustrated in FIG. 5 and iL-ref may be derived therefrom. Based on the operating point of the converter (input and output voltages, inductance value), the parameters of the reference signal 40 can be determined and the reference signal 40 is generated. The current waveforms 51, 52 and 53 of all three converter legs 31, 32, 33 are started at the same point in time. The counter signal 46 is again employed, and for current waveform 51, only intersections with the reference signal 40 corresponding to count 1 are considered. As can be seen, the first intersection that is considered occurs at count 2 between the second waveform 52 and the reference signal, the second intersection at count 3 between current waveform 53 and the reference signal, and the third intersection 45 at the next count 1 between current waveform 51 and the reference signal. It is clear that the first intersection occurs too late, and the third intersection occurs too early, so that the three current waveforms 51, 52, 53 do not have the desired phase shift. However, due to the above-described mechanism, at the second intersection, the timing already corresponds closely to the desired phase shift of T/3 between the different waveforms. By making use of the reference signal 40, fast convergence to the desired timing and phase shift can thus be achieved.

FIG. 15 illustrates a further example in which the operation of the power converter changes from the buck operation having the current waveform of FIG. 11 to the boost operation having the current waveform of FIG. 12. Similar to FIGS. 13 and 14, the waveforms 51, 52 and 53 have the desired phase shift and intersect the reference signal 40 at iL-ref2. At T=2, a step change is applied for the input voltage Vin of the power converter, so that the input voltage Vin becomes lower than the output voltage Vout. The operating mode of the power converter is thus changed from the buck mode to the boost mode in which the waveform of FIG. 12 is applied, in particular by setting the reference iL-ref above the reference iL-ref2 as shown in the upper diagram of FIG. 15. Upon such change of the operating mode, the reference signal 40 is adapted by changing from a leading-edge ramp signal to a trailing edge ramp signal. The change can be detected by the unit 92 based on the current references and a respective indication can be provided to the ramp generator 93 to generate a trailing edge ramp instead of a leading-edge ramp. Furthermore, the parameters of the ramp are adapted as outlined in detail above in accordance with the new references, in particular in accordance with the change of T that is due to the change in the waveform and thus to a different length of sections A, B, C of current waveforms 51, 52, 53. Also in the boost mode, the intersection of section B of the current waveform with reference signal 40 is detected, and at intersection 47, the transition to section C and thus to the third switching state 28 of FIG. 10 is triggered. In a similar manner as described above, the timing of the current waveforms 51, 52, 53 and the intersection of section B with reference signal 40 will now converge towards the desired phase shift and to the desired value iL-ref2. Accordingly, also when the operating mode of the power converter is changed, a fast, efficient and robust synchronization of the phases of the switching sequences of the different converter legs is achieved.

Such interleaving operation using a reference signal 40 may be termed "interleaving by compensation ramp (ICR)". The control operates independently in each of the phases, as shown in the above graphs, i.e., there is no master-slave relationship, and it is robust and relatively simple to implement. It does in particular not require complex mathematical processes when generating the compensation ramp at each instant of time. A simple implementation in a field programmable gate array (FPGA) or on a CPU is thus possible. Units 91 to 95 of controller 80 may for example be implemented as respective software running on processing unit 81. The above examples of FIGS. 13 to 15 have been given with respect to the TCM modulation, it should however be clear that they also apply to the BCM-modulation or other types of modulation having variable switching frequency. The switching sequence of the BCM-modulation may essentially consist of the switching states 26 and 28 illustrated in FIGS. 8 and 10. Furthermore, it should be clear that the reference signal 40 may be modified in accordance with any conceivable changes to the operation conditions of the power converter 10. For example, if the slope m1 changes, e.g., due to a step change in the input voltage Vin during buck operation, the reference signal may be adapted by a corresponding change in the slope of the ramp and the period T/3 of the ramp (as the period T changes). It should further be clear that the above examples are given for a three-leg power converter but apply correspondingly to converters having a different number of legs, wherein the period of a ramp corresponds to T/number of converter legs. The equations 1 to 10 can be adapted correspondingly.

The disclosed method and controller may allow the establishing of the time delay between the switching sequences of the different converter legs by employing a single reference signal, and a fast convergence to the desired time delay is achieved. In embodiments, the method and controller may employ a continuous measurement of phase currents (i.e., inductor currents through the inductors of the respective converter cells), which makes the solution robust, as it may not be influenced by possible tolerances between semiconductor and magnetic components, which could result in an incorrect interleaving being applied. This has particular benefits for types of modulation that require a high level of accuracy to provide the correct converter output, such as BCM and TCM.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling operation of a multi-cell switching power converter, wherein the power converter comprises at least two converter legs connected in parallel, each converter leg including at least one converter cell that is operated in accordance with a switching sequence that includes transitions between predetermined switching states and that generates a current waveform, wherein the method comprises:

operating the power converter in an interleaving mode in which the switching sequence of each of the converter legs is phase shifted with respect to the switching sequences of one or more other converter legs of the at least two converter legs so that each converter leg is operated with a switching sequence having a different phase and generates a current waveform having a corresponding phase shift;

generating a periodic reference signal, wherein a periodicity of the reference signal is determined based on a number of different phases; and controlling the phase shift between the switching sequences of the two or more converter legs by detecting, for each converter leg, an intersection between the current waveform generated and the reference signal, and upon detecting the intersection of the current waveform with the reference signal, triggering a transition to a predetermined switching state of the switching sequence.

2. The method according to claim 1, wherein a period of the switching sequence is variable and allowed to vary during operation, wherein the method further comprises deriving from a trigger value for triggering the transition to a subsequent switching state a target period of the switching sequence and, upon a change of the trigger value (iref), adapting a period of the reference signal in accordance with a resulting change of the target period of the switching sequence.

3. The method according to claim 1, wherein the periodic reference signal is a sawtooth-shaped signal comprising repeating ramps.

4. The method according to claim 3, wherein within one period of the switching sequence, the reference signal comprises one ramp for each converter leg.

5. The method according to claim 1, wherein the method further comprises obtaining a reference current (iref) for the transition to the switching state, and determining a period of the switching sequence based on the reference current (iref) and the current waveform.

6. The method according to claim 1, wherein the reference signal is generated based on an upper limit ($i_t$) and a lower limit ($i_p$), wherein generating the reference signal comprises generating a ramp from the upper limit ($i_t$) to the lower limit ($i_p$) and resetting the ramp upon reaching the lower limit ($i_p$), or generating a ramp from the lower limit ($i_p$) to the upper limit ($i_t$) and resetting the ramp upon reaching the upper limit ($i_t$).

7. The method according to claim 5, wherein generating the periodic reference signal comprises setting a slope (a) of the ramp to a predetermined value ($m_1$) and deriving the upper limit ($i_t$) and the lower limit ($i_p$) based on the current reference (iref) and the period of the switching sequence, or wherein generating a periodic reference signal comprises setting the upper limit and the lower limit ($i_p$) such that the current reference (iref) lies between the upper limit ($i_t$) and the lower limit ($i_p$) and deriving a slope (a) of the ramp based on the period of the switching sequence.

8. The method according to claim 1, wherein for each converter leg, a transition from a last switching state of the switching sequence to a first switching state of the next switching sequence occurs at a zero crossing of an inductor current of the converter cell of the respective converter leg.

9. The method according claim 1, wherein the switching sequence corresponds to an operation of the power converter in a modulation mode, wherein the modulation mode is a boundary conduction mode or is a three-stage conduction mode in which the current waveform includes a first section (A) of rising current, a second section (B) of rising, falling or constant current and a third section (C) of falling current.

10. The method according to claim 9, wherein the modulation mode is the three-stage conduction mode, wherein the transition that is triggered corresponds to the transition from the second section (B) to the third section (C) of the current waveform, wherein, the power converter is operable in a buck mode in which the second section (B) of the current waveform corresponds to a rising current and in which the reference signal is generated as a sequence of repeating leading edge ramps, and/or is operable in a boost mode in which the second section (B) corresponds to a falling current and in which the reference signal is generated as a sequence of repeating trailing edge ramps.

11. The method according to claim 1, wherein the periodic reference signal) comprises a sequence of a repeating reference waveform, wherein within the duration of one period of the switching sequence, the reference signal comprises one reference waveform per converter leg, the reference waveform being associated with the respective converter leg, and wherein detecting an intersection between the current waveform of each converter leg and the periodic reference signal comprises detecting the intersection between the current waveform of the converter leg and the reference waveform associated with the converter leg.

12. The method according to claim 11, further comprising counting the reference waveforms in the reference signal using a counter, associating each converter leg with a different count and detecting the intersection of the reference signal with the current waveform of a converter leg only for the reference waveform of the reference signal corresponding to the count associated with the respective converter leg.

13. A controller of a multi-cell switching power converter, wherein the power converter comprises at least two converter legs connected in parallel and providing a phase shifted output current, each converter leg including at least one converter cell that is operated in accordance with a switching sequence that includes transitions between predetermined switching states and that generates a current waveform in the converter leg, wherein the controller is configured to perform the method according to claim 1.

14. A multi-cell switching power converter comprising least two converter legs connected in parallel and providing a phase shifted output current, wherein the power converter further comprises a controller according to claim 13.

15. A computer program product, comprising a computer readable hardware storage device having computer readable program code stored therein, said program code executable by a processor of a computer system to implement the method of claim 1.

* * * * *